(12) United States Patent <br>Sugaya et al.

(10) Patent No.: US 12,600,035 B2 <br>(45) Date of Patent: Apr. 14, 2026

(54) INFORMATION PROCESSING METHOD, INFORMATION PROCESSING APPARATUS, ROBOT SYSTEM, MANUFACTURING METHOD OF PRODUCT, AND STORAGE MEDIUM

(71) Applicant: CANON KABUSHIKI KAISHA, Tokyo (JP)

(72) Inventors: Satoshi Sugaya, Kanagawa (JP); Hironobu Sasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 18/215,235

(22) Filed: Jun. 28, 2023

(65) Prior Publication Data

US 2024/0009838 A1 Jan. 11, 2024

(30) Foreign Application Priority Data

Jul. 5, 2022 (JP) ................................. 2022-108081 <br>Jun. 1, 2023 (JP) ................................. 2023-091095

(51) Int. Cl. <br>B25J 9/16 (2006.01)

(52) U.S. Cl. <br>CPC ........... B25J 9/1656 (2013.01); B25J 9/1605 (2013.01)

(58) Field of Classification Search <br>CPC ...... B25J 9/1656; B25J 9/1605; B25J 9/1666; G05B 2219/40317; G05B 2219/40479 <br>See application file for complete search history.

(56) References Cited

U.S. PATENT DOCUMENTS

| | | | |
|---|---|---|---|
| 10,011,011 B2 | 7/2018 | Sugaya | |
| 10,846,929 B2 | 11/2020 | Sugaya | |
| 11,090,804 B2 | 8/2021 | Sugaya | |
| 2019/0105779 A1* | 4/2019 | Einav | B25J 9/1689 |
| 2019/0143522 A1* | 5/2019 | Miyazawa | B25J 9/1676 |
| | | | 700/258 |
| 2019/0202449 A1* | 7/2019 | Taveira | G08G 5/55 |
| 2019/0205609 A1* | 7/2019 | Taveira | G08G 5/80 |
| 2021/0240337 A1* | 8/2021 | Fujii | G06F 30/17 |
| 2021/0260763 A1 | 8/2021 | Tonogai et al. | |
| 2021/0339385 A1 | 11/2021 | Sugaya | |
| 2023/0267690 A1 | 8/2023 | Sugaya | |
| 2023/0271314 A1 | 8/2023 | Tokuoka et al. | |

FOREIGN PATENT DOCUMENTS

| | | |
|---|---|---|
| JP | 2008-033419 A | 2/2008 |
| JP | 2014-018941 A | 2/2014 |
| JP | 2020-110885 A | 7/2020 |

OTHER PUBLICATIONS

Co-pending U.S. Appl. No. 18/301,354, filed Apr. 17, 2023. <br>Co-pending U.S. Appl. No. 18/350,275, filed Jun. 11, 2023.

* cited by examiner

*Primary Examiner* — Adam R Mott <br>*Assistant Examiner* — Heather J Keniry <br>(74) *Attorney, Agent, or Firm* — Venable LLP

(57) ABSTRACT

An information processing method includes in performing an interference confirmation between at least two components, executing an individual threshold setting processing of setting a threshold individually for at least one of the components for the interference confirmation, and executing an interference confirmation processing of performing the interference confirmation by setting a predetermined threshold to be used for the interference confirmation based on thresholds set for the components and a predetermined condition.

20 Claims, 18 Drawing Sheets

421

INTERFERENCE CHECK GROUP LIST

GrA 102A
103A
104A

HAND
FIRST FINGER
SECOND FINGER

421a

GrB

BaA

BbA

SMALL BOX
LARGE BOX

421b

430

INTERFERENCE CHECK
COMBINATION LIST

| | | | |
|---|---|---|---|
| HAND | × SMALL BOX | HAND | × LARGE BOX |
| FIRST FINGER | × SMALL BOX | FIRST FINGER | × LARGE BOX |
| SECOND FINGER | × SMALL BOX | SECOND FINGER | × LARGE BOX |

▦ INTERFERENCE CHECK NOT EXECUTED FOR
COMPONENTS INCLUDED IN SAME GROUP

FIG.16

INTERFERENCE CHECK COMBINATION LIST                430

| HAND × SMALL BOX | HAND × LARGE BOX |
|---|---|
| FIRST FINGER × SMALL BOX | FIRST FINGER × LARGE BOX |
| SECOND FINGER × SMALL BOX | SECOND FINGER × LARGE BOX |

⇩  COMPARISON CONDITION: BOTH VALUES

THRESHOLD COMPARISON LIST                640

| COMBINATION | COMPARE THRESHOLD | | FIRST THRESHOLD | SECOND THRESHOLD |
|---|---|---|---|---|
| HAND × SMALL BOX : | 10mm > 3mm | ⟶ | 3mm | 10mm |
| FIRST FINGER × SMALL BOX : | 3mm = 3mm | ⟶ | 3mm | – |
| SECOND FINGER × SMALL BOX : | 3mm = 3mm | ⟶ | 3mm | – |
| HAND × LARGE BOX : | 10mm > 4mm | ⟶ | 4mm | 10mm |
| FIRST FINGER × LARGE BOX : | 3mm < 4mm | ⟶ | 3mm | 4mm |
| SECOND FINGER × LARGE BOX : | 3mm < 4mm | ⟶ | 3mm | 4mm |

⇩ INTERFERENCE CHECK CLASSIFIED BY VELOCITY USING FIRST THRESHOLD AND SECOND THRESHOLD                750

INTERFERENCE CHECK DETERMINATION CLASSIFIED BY VELOCITY $-200 \leq vel \leq 200$ ABNORMAL (INTERFERENCE STATE) : $x \leq 0$ WARNING (CLEARANCE) : $0 < x \leq$ FIRST THRESHOLD $vel < -200$ or $200 < vel$ ABNORMAL (INTERFERENCE STATE) : $x \leq 0$ WARNING (CLEARANCE) : $0 < x \leq$ SECOND THRESHOLD

INFORMATION PROCESSING METHOD, INFORMATION PROCESSING APPARATUS, ROBOT SYSTEM, MANUFACTURING METHOD OF PRODUCT, AND STORAGE MEDIUM

BACKGROUND OF THE INVENTION

Field of the Invention

The present invention relates to an information processing method, an information processing apparatus, a robot system, a manufacturing method of a product, and a storage medium.

Description of the Related Art

Heretofore, confirmation of movement of a robot is performed in advance using an interference check so that the robot will not collide with a surrounding environment when the robot is moved. In the interference check, distance between target objects is calculated, and in a state where the calculated distance is equal to or smaller than a threshold set so as to execute the interference check between target objects, it is determined that interference may occur. A method for setting an individual threshold for each of the target objects in setting thresholds for target objects of the interference check is disclosed (refer to Japanese Patent Application Laid-Open Publication No 2020-110885).

SUMMARY OF THE INVENTION

According to a first aspect of the present invention, an information processing method includes in performing an interference confirmation between at least two components, executing an individual threshold setting processing of setting a threshold individually for at least one of the components for the interference confirmation, and executing an interference confirmation processing of performing the interference confirmation by setting a predetermined threshold to be used for the interference confirmation based on thresholds set for the components and a predetermined condition.

According to a second aspect of the present invention, an information processing apparatus is configured to execute in performing an interference confirmation between at least two components, an individual threshold setting processing of setting a threshold individually for at least one of the components for the interference confirmation, and an interference confirmation processing of performing the interference confirmation by setting a predetermined threshold to be used for the interference confirmation based on thresholds set for the components and a predetermined condition.

Further features of the present invention will become apparent from the following description of exemplary embodiments with reference to the attached drawings.

BRIEF DESCRIPTION OF THE DRAWINGS

FIG. 16 is an explanatory view illustrating the interference check combination list created in the information processing apparatus, a threshold comparison list, and an interference check determination according to the third embodiment of the present invention.

DESCRIPTION OF THE EMBODIMENTS

Generally, in a state where thresholds are respectively set for each of the target objects for an interference check, the interference check is performed using a value obtained by adding the thresholds set for each of the target objects. In such an interference check, it is determined that there is a risk of interference if the distance between the target objects become equal to or smaller than the value having added the thresholds, such that there was a drawback that the distance between target objects is set to a distance greater than necessary.

Therefore, the present invention provides a technique of setting the distance between elements being the target of the interference check to an appropriate distance.

First Embodiment

Now, an embodiment for carrying out the present technique will be described in detail with reference to the drawings. The configuration illustrated below is merely an example, and detailed configurations can be varied arbitrarily by those skilled in the art without deviating from the concept of the present invention. Further, the numerical values illustrated in the following description are reference values, and they are merely examples.

Configuration of Robot System

Figure 1:
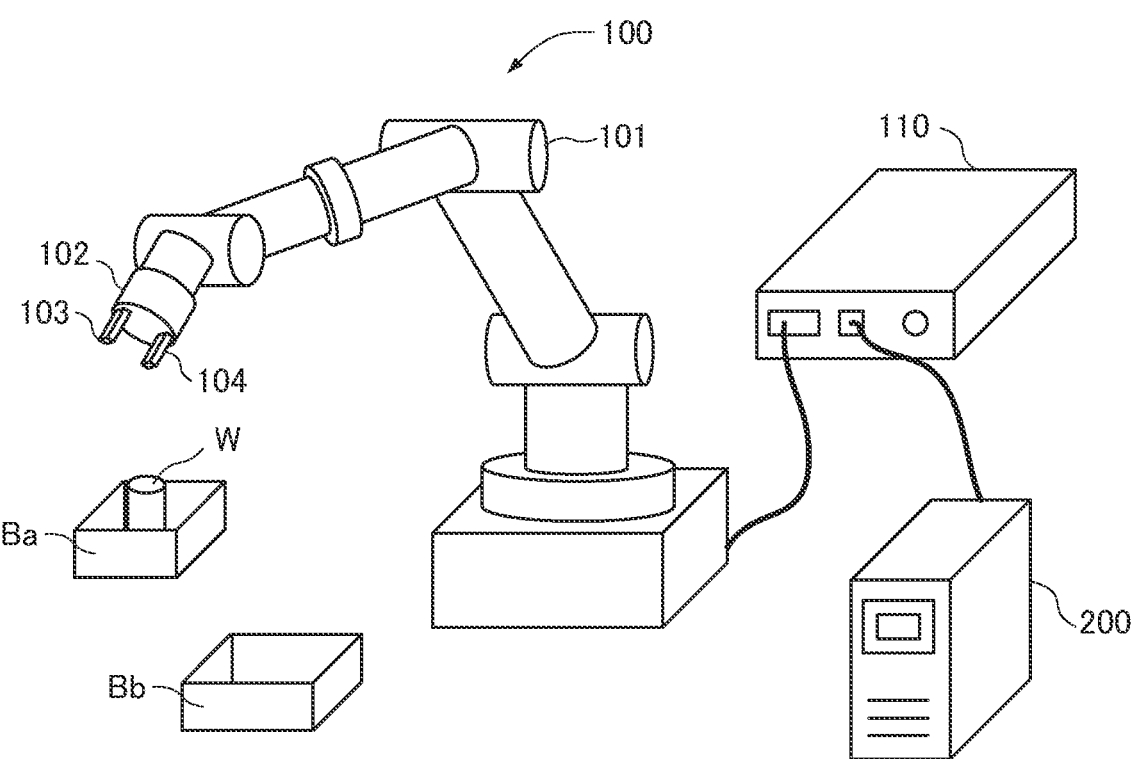
FIG. 1 is a schematic drawing of a robot system according to a first embodiment of the present invention.

FIG. 1 is a view illustrating a general configuration of a robot system 1 according to a first embodiment of the present invention. As illustrated in FIG. 1, the robot system 1 includes a robot apparatus 100 serving as an industrial robot, a control apparatus 110 that performs control to move the robot apparatus 100, and an information processing apparatus 200 serving as a teaching device, that is, a simulator.

The robot apparatus 100 is used for purposes such as manufacturing, conveying, and picking products. The robot apparatus 100 includes a hand 102, which is an example of an end effector and which serves as a robot hand capable of gripping a work W, and an arm 101 having the hand 102 disposed on a tip thereof and serving as a robot arm that controls the position of the hand 102 and that has a plurality of joints. The robot apparatus 100 is positioned and arranged on a stand or a floor surface not shown, for example.

The hand 102 has a first finger 103 and a second finger 104, and includes a motor not shown for driving the first finger 103 and the second finger 104 disposed in an interior thereof, wherein by the motor being driven, the first finger 103 and the second finger 104 are moved toward or away from each other. When gripping the work W, the hand 102 causes the first finger 103 and the second finger 104 to move toward one another and to contact the work W. That is, the hand 102 functions as a tool for gripping the work W by the first finger 103 and the second finger 104.

The work W is stored in a small box Ba in a periphery of the robot apparatus 100. Further, an empty large box Bb is arranged in the periphery of the robot apparatus 100. In the first embodiment, an operation is assumed in which the work W is moved from the small box Ba to the large box Bb using the robot apparatus 100.

The control apparatus 110 controls the arm 101 and the hand 102 based on a movement information of the arm 101 and the hand 102, that is, based on a trajectory control data, or teaching data, for creating a trajectory of the arm 101 and the hand 102. The control apparatus 110 acquires the teaching data from the information processing apparatus 200. The teaching data includes command information and teaching point information. The control apparatus 110 according to the first embodiment moves the arm 101 and the hand 102 based on the teaching data to cause the robot apparatus 100 to grip the work W. The robot apparatus 100 moves the arm 101 and the hand 102 while gripping the work W to thereby convey the work W to the large box Bb.

The information processing apparatus 200 is composed of a computer and functions as a teaching device, that is, a simulator. In the first embodiment, the information processing apparatus 200 creates the teaching data through computer simulation, that is, through off-line teaching, and performs simulation to confirm the movement of the robot apparatus 100 in advance. As described above, the information processing apparatus 200 outputs the created teaching data to the control apparatus 110. The information processing apparatus 200 outputs the teaching data through cable communication to the control apparatus 110. Alternatively, regarding the method for outputting the teaching data, the information processing apparatus 200 can be configured to output the teaching data to the control apparatus 110 through wireless communication instead of cable communication.

Control Block Diagram of Control Apparatus

Figure 2:
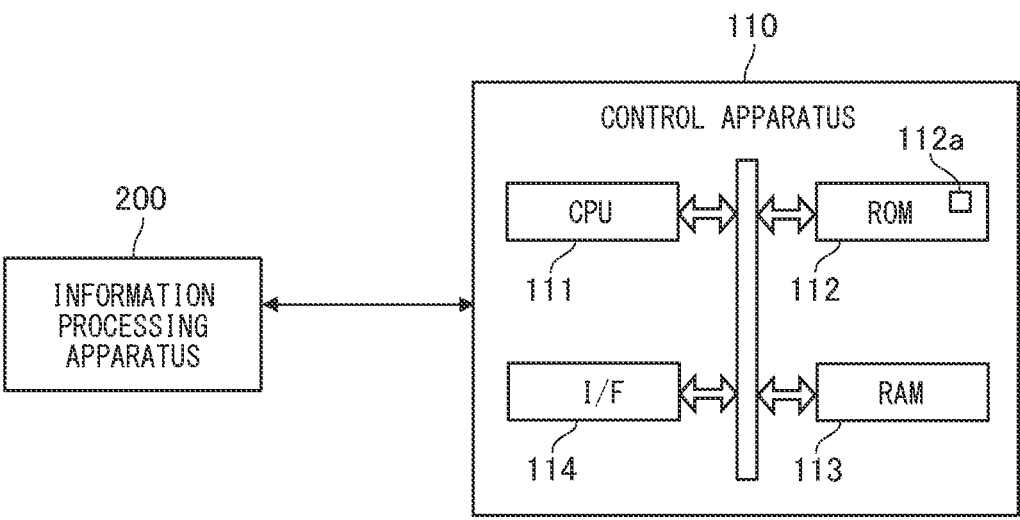
FIG. 2 is a control block diagram of a control apparatus equipped in a robot apparatus according to the first embodiment of the present invention.

FIG. 2 is a control block diagram of the control apparatus 110. As illustrated in FIG. 2, the control apparatus 110 is composed of a computer including a microprocessor. As illustrated in FIG. 2, the control apparatus 110 includes a Central Processing Unit (CPU) 111, a Read Only Memory (ROM) 112, and a Random Access Memory (RAM) 113. Further, the control apparatus 110 includes a communication interface (hereinafter referred to as "I/F") 114.

A program 112a is stored in the ROM 112. The program 112a is a program for having a computer, that is, the CPU 111, execute a method for controlling the robot apparatus 100. The RAM 113 is used to temporarily store the teaching data received from the information processing apparatus 200 or data such as a control command. The CPU 111 acquires the teaching data output from the information processing apparatus 200 by receiving the data through the I/F 114. Further, the CPU 111 creates a trajectory of each axis of the robot apparatus 100 based on the teaching data and transmits a command as a control target value through the I/F 114 to the robot apparatus 100.

According to the first embodiment, the program 112a is stored in the ROM 112, but the present technique is not limited thereto. The program 112a can be stored in any storage medium, as long as it is a computer-readable non-transitory storage medium. The storage medium for supplying the program 112a to the computer can be, for example, a flexible disk, a hard disk, an optical disk, a magneto-photo disk, a magnetic tape, and a nonvolatile memory.

Configuration of Information Processing Apparatus

Figure 3:
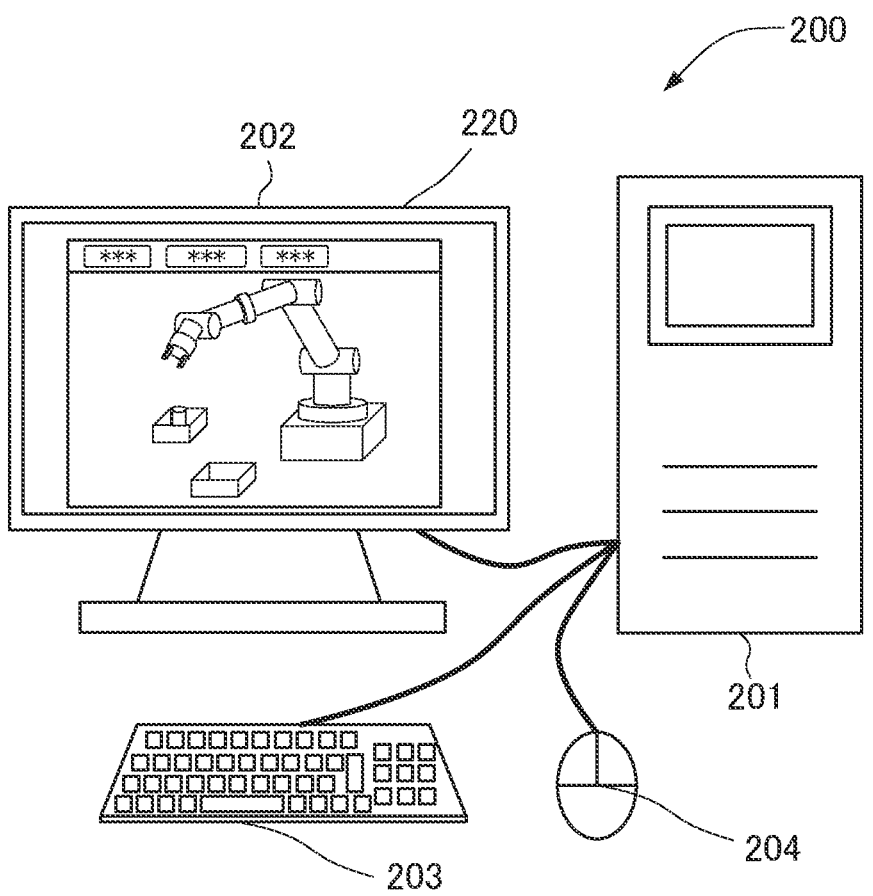
FIG. 3 is a schematic drawing of an information processing apparatus according to the first embodiment of the present invention.

FIG. 3 is an explanatory view of the information processing apparatus 200 according to the first embodiment. The information processing apparatus 200 includes an apparatus body 201, a display 202 which is an example of a display apparatus connected to the apparatus body 201, and a keyboard 203 and a mouse 204 which are examples of an input apparatus connected to the apparatus body 201. Hereafter, an example in which the information processing apparatus 200 is a desktop personal computer serving as a general-purpose computer is described, but the present technique is not limited thereto. The information processing apparatus 200 can be other general-purpose computers such as a laptop PC, a tablet PC, and a smartphone, or a teaching pendant, or a simulator-dedicated computer. Further, the information processing apparatus 200 can be incorporated in the control apparatus 110. That is, the control apparatus 110 can include the function of a simulator.

The display 202 for displaying information displays a simulation screen 220 through which the user confirms the teachings of the robot apparatus 100, the movement of the robot apparatus 100, and confirmation of interference between components included in the robot system 1. An image displayed on the screen of the display 202 is updated every $\frac{1}{60}$ seconds (approximately 16.7 ms). In other words, the display 202 serving as the display apparatus displays information communicated by the control apparatus 110 and the information processing apparatus 200.

The display 202 can also be formed by laminating a so-called touch panel on the surface. If a touch panel is laminated on the surface, an input operation equivalent to those performed using input apparatuses such as the keyboard 203 and the mouse 204 can be performed by the touch panel on the display 202. According to this configuration, the information processing apparatus 200 can adopt a configuration in which an input apparatus other than the display 202 is not included.

The information processing apparatus 200 according to the first embodiment is capable of confirming whether interference is present in the movement of the arm 101 and the hand 102 mainly in an offline environment. Further, the operation of entering, editing and changing various information of the simulator of the robot system 1 is configured to be performed through the input apparatus such as the keyboard 203 and the mouse 204.

The simulation screen 220 of FIG. 3 includes at least a virtual space screen. The virtual space screen can be configured as a Graphical User Interface (GUI). In that case, the information processing apparatus 200 is configured to enable objects, such as a menu, an entry field for entering numerical values and characters, and a virtual display of the robot, constituting the simulation screen 220 to be operated using a pointing device such as a mouse 204. In a state where the display 202 of the information processing apparatus 200 is configured as a touch panel described above, the objects constituting the simulation screen 220 can be operated through the touch panel.

Figure 4:
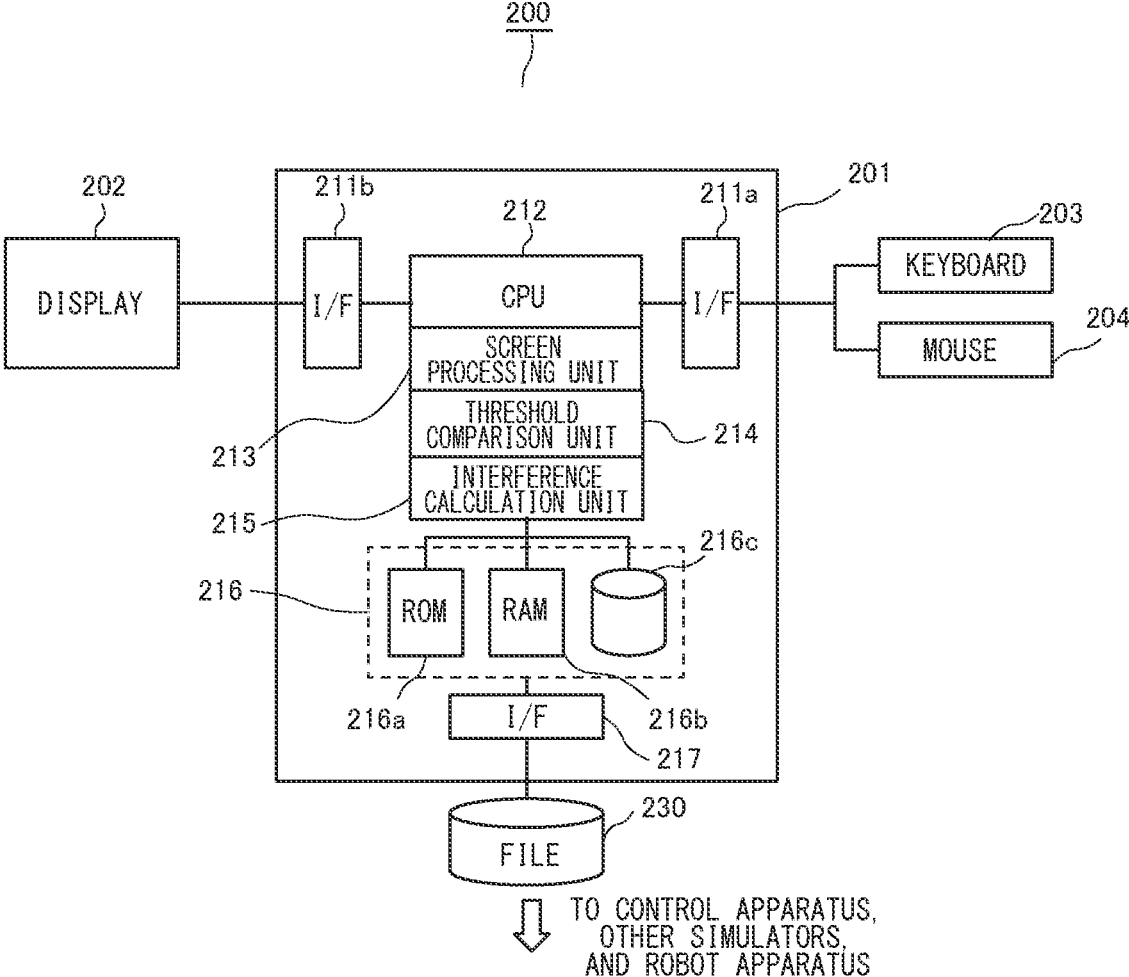
FIG. 4 is a control block diagram of the information processing apparatus according to the first embodiment of the present invention.

FIG. 4 is a control block diagram illustrating a control system of the information processing apparatus 200. As illustrated in FIG. 3, the apparatus body 201 of the information processing apparatus 200 includes, as hardware, a CPU 212, and a storage apparatus 216 including a ROM 216a, a RAM 216b, and a Hard Disk Drive (HDD) 216c.

Further, the apparatus body 201 includes an I/F 211a for communicating and connecting with the input apparatus such as the key board 203 and the mouse 204, and an/F 211b for communicating and connecting with the display 202. Further, the apparatus body 201 includes an I/F 217 for transmitting and receiving data in the form of a file 230 with external apparatus such as the control apparatus 110, other simulators and robot apparatuses. These interfaces are composed, for example, of serial and parallel buses and network interfaces.

The ROM 216a is a non-transitory storage apparatus. A basic program read by the CPU 212 when starting the computer is stored in the ROM 216a. The RAM 216b is a transitory storage apparatus that is used to perform arithmetic processing of the CPU 212. The HDD 216c is a non-transitory storage apparatus that stores various data such as the result of arithmetic processing of the CPU 212. A program that functions as an application software is stored in the HDD 216c according to the first embodiment. By executing the program stored in the HDD 216c, the CPU 212 functions as an information processing unit capable of simulating behaviors of a virtual robot, i.e., arm and hand, and a virtual work in a virtual environment described below.

In the first embodiment, the computer readable non-transitory storage medium is the HDD 216c, and a program functioning as the application software is stored in the HDD 216c, but the present technique is not limited thereto. The program can be stored in any storage medium, as long as it is a computer readable non-transitory storage medium. The storage medium for installing the program to the computer can be a flexible disk, an optical disk, a magneto-photo disk, a magnetic tape, or a nonvolatile memory, for example.

The CPU 212 controls the entire system of the information processing apparatus 200. The CPU 212 includes a screen processing unit 213, a threshold comparison unit 214, and an interference calculation unit 215 as an arithmetic processing unit.

The screen processing unit 213 performs a control operation based on input and editing operations of the simulation screen 220 performed by operating the keyboard 203 and the mouse 204. The information processing apparatus 200 creates a display control information for updating the display on the simulation screen 220 and an interference check setting information described below by the control computation of the screen processing unit 213, and stores the created setting information in the storage apparatus 216.

The threshold comparison unit 214 and the interference calculation unit 215 are arithmetic areas used by the CPU 212 to execute a control flowchart for performing the interference check described below. The threshold comparison unit 214 performs comparison of the thresholds set for respective components serving as the target of interference check based on the setting information of the interference check, creates a threshold information used for the interference check, and stores the threshold information in the storage apparatus 216. The interference calculation unit 215 outputs a result of the interference check based on the interference setting information and the threshold information.

The storage apparatus 216 stores a model information, which is the information of components displayed on the simulation screen 220, an interference setting information and the threshold information related to components being the target of interference check, and the threshold information. The respective information stored in the storage apparatus 216 is output in response to a request from the CPU 212 or updated in response to a request from the CPU 212. Further, the CPU 212 can transmit various information stored in the storage apparatus 216 in the form of files 230 from the I/F 217 in response to a request from an external apparatus or in response to specific operations performed using the keyboard 203 or the mouse 204. Further, the file 230 from the exterior can be read through the i/F 217 according to need.

When starting or performing a restoration processing of the information processing apparatus 200, the file 230 that had been output in the past from an external apparatus, i.e., external storage apparatus such as a Solid State Drive (SSD) or a Network Attached Storage (NAS), is read. The information processing apparatus 200 can restore a previous storage state by updating the storage apparatus 216. In the first embodiment, a storage area of the storage apparatus 216 for storing components can be determined arbitrarily, and for example, a predetermined area in the RAM 216b or a storage area corresponding to a predetermined file in the HDD 216c can be used.

Simulation Screen

Figure 5:
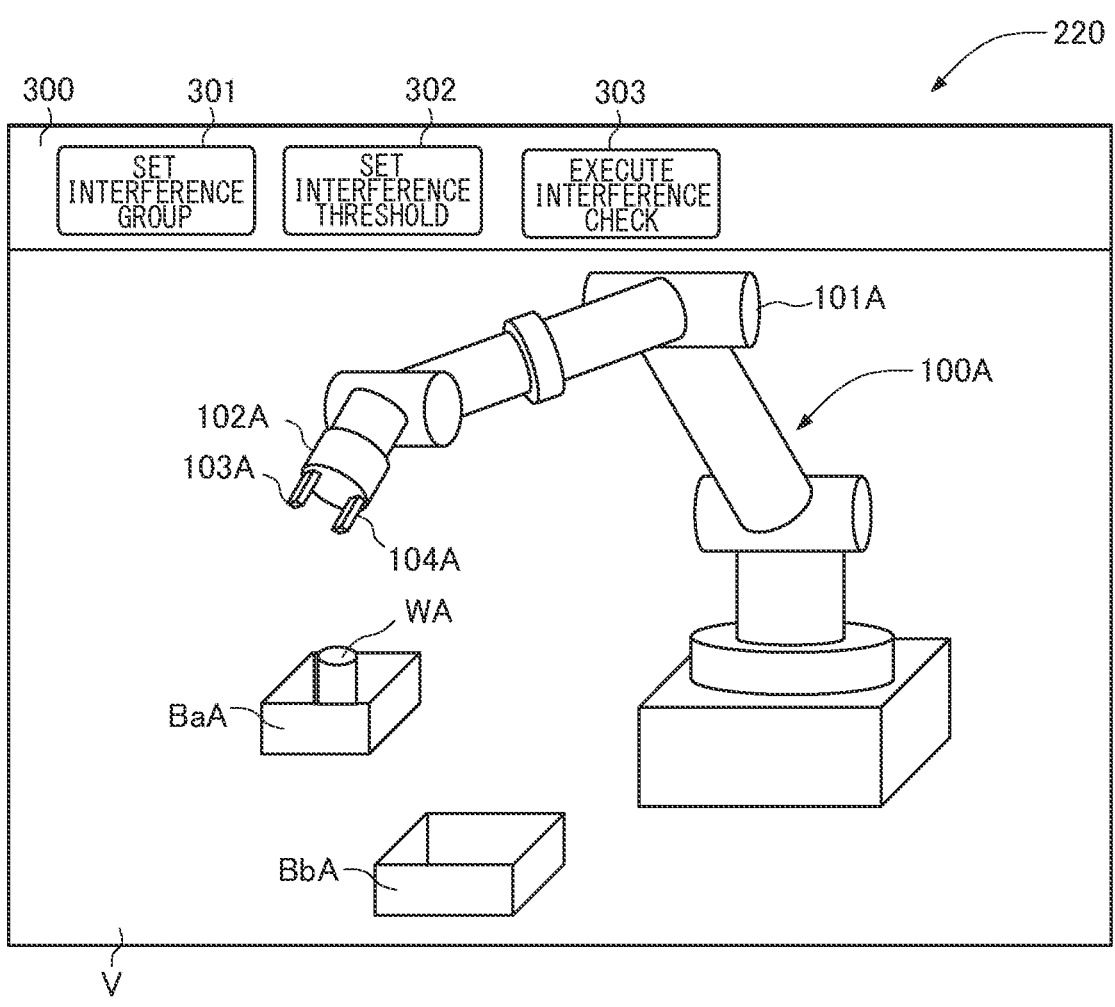
FIG. 5 is a diagram illustrating a simulation screen displayed on a display of the information processing apparatus according to the first embodiment of the present invention.

FIG. 5 is an explanatory view of the simulation screen 220 displayed on the display 202 when simulation is performed by the information processing apparatus 200 according to the first embodiment. The information processing apparatus 200 according to the first embodiment operates the robot apparatus 100 and performs various simulations according to the information displayed on the display 202.

A virtual space V serving as a virtual environment and a tool bar 300 serving as a processing menu are displayed on the simulation screen 220. Virtual objects in the virtual space V are defined by a three-dimensional model data, such as a CAD data, and for convenience, they are visualized and illustrated as a structure. An interference group setting button 301, an interference threshold setting button 302, and an interference check execution button 303 for calling various screens onto the display for performing necessary settings for the interference heck described later are displayed on the tool bar 300.

A virtual object defined in the virtual space V illustrated in FIG. 5 will be described. In the virtual space V, a three-dimensional model data simulating the robot apparatus 100, the arm 101, the hand 102, the first finger 103, the second finger 104, the work W, the small box Ba, and the large box Bb illustrated in FIG. 1 are respectively defined. As illustrated in FIG. 5, in the virtual space V, a virtual robot apparatus 100A, a virtual arm 101A, a virtual hand 102A, a virtual first finger 103A, a virtual second finger 104A, a virtual work WA, a virtual small box BaA, and a virtual large box BbA are respectively defined.

The CPU 212 simulates a movement of gripping the work WA by the arm 101A and the hand 102A. The virtual space V is displayed by still image or video on the simulation screen 220 of the display 202 illustrated in FIG. 2.

The tool bar 300 is displayed on an upper portion of the simulation screen 220. The interference group setting button 301, the interference threshold setting button 302, and the interference check execution button 303 are displayed on the tool bar 300. The interference group setting button 301 is a button for displaying a setting screen for selecting components that are the targets of interference check and forming a group. The interference threshold setting button 302 is a button for displaying a setting screen for setting a threshold for each component being the target of the interference check. The interference check execution button 303 is a button for carrying out the interference check based on the various information being set.

In a state where the interference check execution button 303 is selected by the operation of the mouse 204, the CPU 212 moves the component within the virtual space V based on a movement data created in advance, and calculates the distance between target objects each time the screen on the display 202 is updated. Then, the CPU 212 determines whether or not the calculated result is an interference or a warning, and displays the determined result on the simulation screen 220. In other words, the interference check is included in a simulation performed by the information processing apparatus 200.

Interference Check

Figure 6:
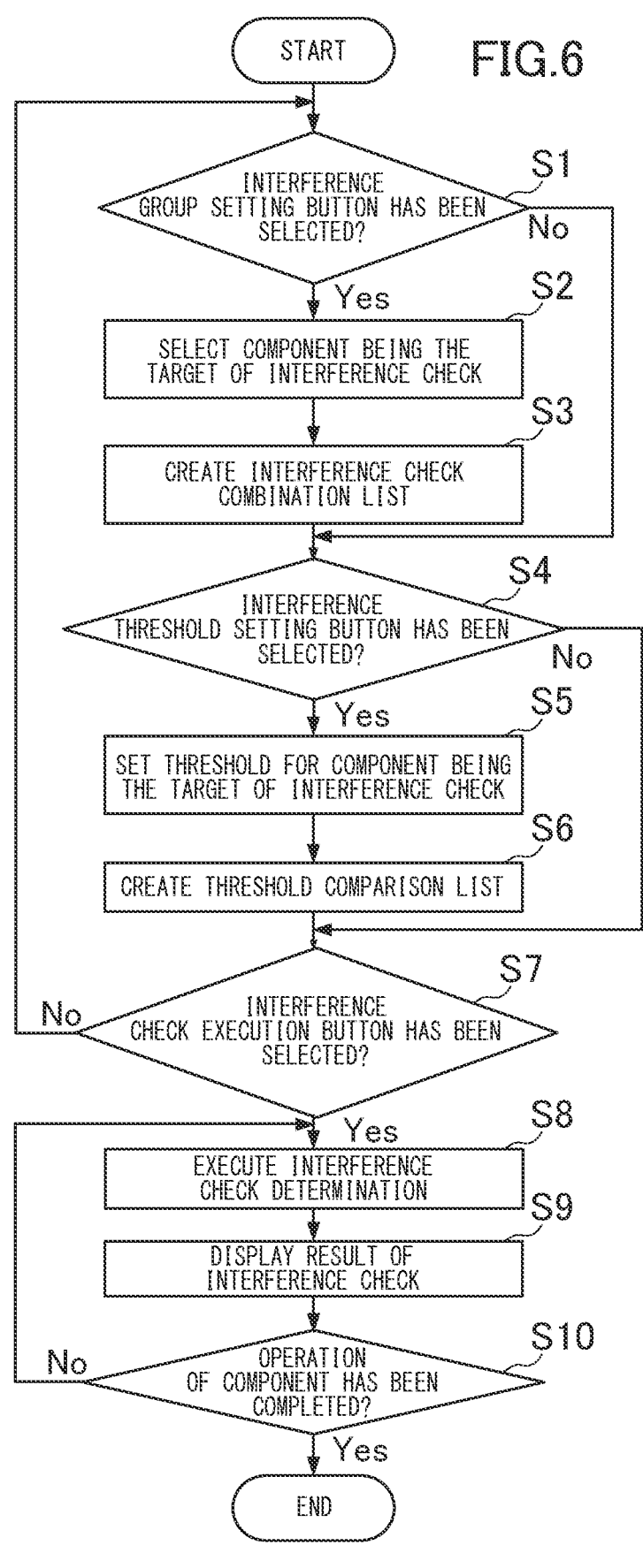
FIG. 6 is a flowchart illustrating an interference check executed by the information processing apparatus according to the first embodiment of the present invention.

Next, the details of the interference check executed by the information processing apparatus 200 according to the first embodiment will be described with reference to FIGS. 6 to 9. FIG. 6 is a flowchart illustrating an interference check executed by the CPU 212 of the information processing apparatus 200 according to the first embodiment. The CPU 212 performs various settings required for executing the interference check by executing the processes of steps S1 to S7 illustrated in FIG. 6. Further, the CPU 212 executes the processes of steps S8 to S10 each time the display of the virtual space V displayed on the display 202 is updated, and performs the interference check.

At first, the CPU 212 determines whether the interference group setting button 301 (refer to FIG. 5) has been selected (S1). In this processing, the CPU 212 determines whether to call up the interference group setting screen based on the selection of the interference group setting button 301 through the operation of the mouse 204.

In the processing of step S1, if it is determined that the interference group setting button 301 has been selected (Yes), the CPU 212 selects a component being the target of the interference check (S2). In this processing, the CPU 212 displays the interference group setting screen in response to the operation of the interference group setting button 301. Further, the screen processing unit 213 of the CPU 212 selects the component being the target of the interference check according to the operation performed in the interference group setting screen, and forms a group of components.

In the interference check according to the first embodiment, the components being the target of the interference check is formed into groups, such that the interference check is performed only for the components that are set as groups. Thus, the information processing apparatus 200 can perform the interference check efficiently by not performing the interference check of components that are not set as groups.

In the interference check, the interference check is performed according to a combination of components between the groups being set. In other words, in the interference check, the interference check between components that are included in the same group are not performed.

Figure 7:
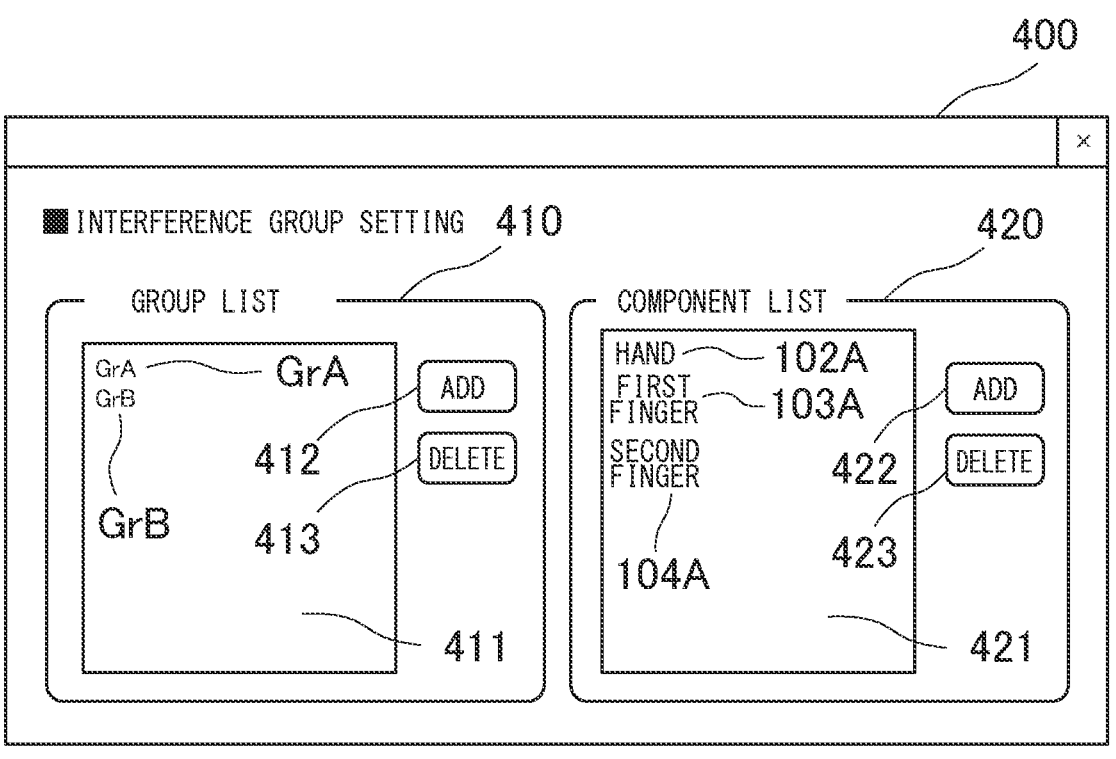
FIG. 7 is a view illustrating an interference group setting screen displayed on a display of the information processing apparatus according to the first embodiment of the present invention.

The processing of step S2 will be described in detail with reference to FIGS. 7 and 8A. FIG. 7 is an explanatory view of an interference group setting screen 400 in which components being the target of the interference check is formed into groups. As illustrated in FIG. 7, a group list 410 which is an area in which a list of groups of components being the target of the interference check is displayed and a component list 420 which is an area in which components included in each group are displayed on the interference group setting screen 400.

A list 411 displaying groups, an add button 412 for adding a group by selecting the group, and a delete button 413 for deleting a group by selecting the group are displayed in the group list 410. In a case where the add button 412 of a group is selected using the mouse 204, the screen processing unit 213 adds a new group to the list 411 and to enable the components being the target of the interference check belonging to the added group to be edited from the component list 420 illustrated on the right side. In the example illustrated in FIG. 7, two groups, which are a "GrA" denoting group GrA and "GrB" denoting group GrB, are displayed on the group list 410 as groups.

A list 421 displaying the components being the target of the interference check belonging to the group selected in the list 411 of groups and an add button 422 for adding the components by being selected are displayed in the component list 420. Further, a delete button 423 for deleting a component by selecting the component is displayed in the component list 420. In the example illustrated in FIG. 7, the hand 102A, the first finger 103A, and the second finger 104A are displayed in the component list 420 as components included in the group GrA among the groups displayed in the group list 410.

In a state where a component of the virtual space V is selected and the add button 422 of the component is selected using the mouse 204, the screen processing unit 213 additionally displays the selected component on the list 421 of components. Thus, the CPU 212 adds a component to the group displayed on the component list 420.

In order to change groups, the group to be changed is selected using the mouse 204 from the groups displayed in the list 411 of groups. The screen processing unit 213 displays the components set in the selected group on the list 421, and allows components included in the selected group to be added or deleted.

When deleting a group, the group to be deleted is selected from the list 411 using the mouse 204, and the delete button 413 is selected, by which the group is deleted from the list 411. Similarly, when deleting a component, the component to be deleted is selected from the list 421 using the mouse 204, and the delete button 423 is selected, by which the component is deleted from the list 421. The adding and deleting operation is not limited to the operation using the mouse 204. For example, the adding and deleting operation can be executed by manipulating keys on the keyboard 203. Further, the adding and deleting operation can be executed by a drag-and-drop operation on the virtual space V using the mouse 204.

Figures 8A, 8B:
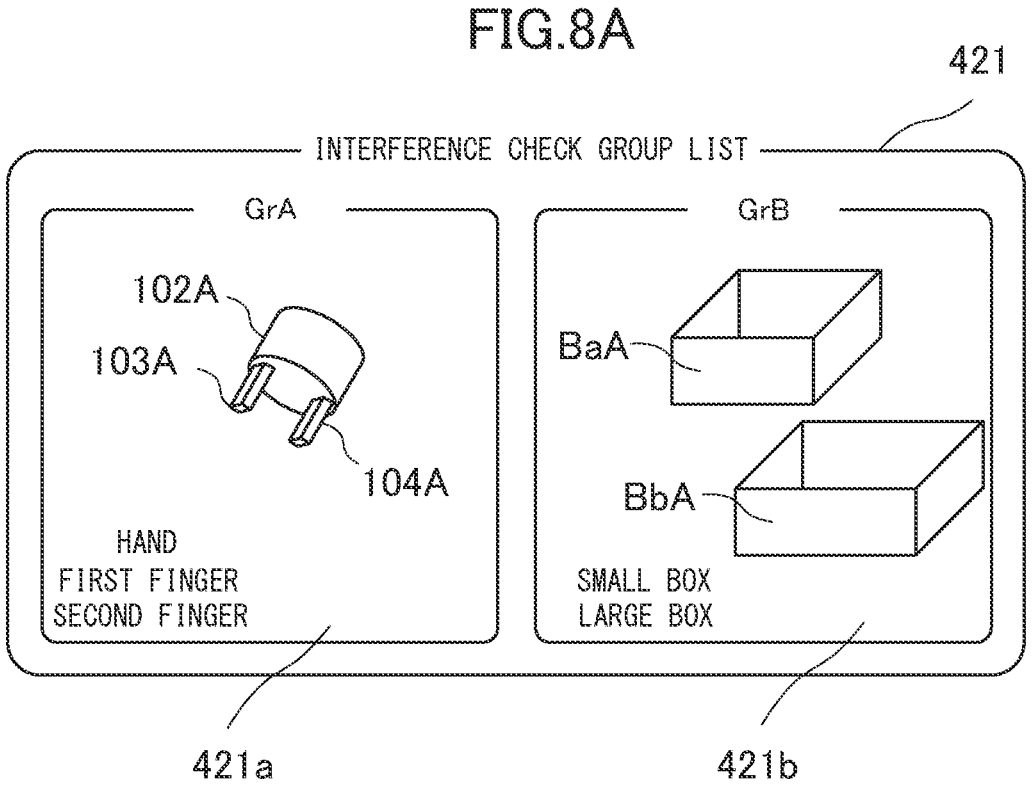
FIG. 8A is an explanatory view illustrating an interference check group list created in the information processing apparatus according to the first embodiment of the present invention.
FIG. 8B is an explanatory view illustrating an interference check combination list created in the information processing apparatus.

FIG. 8A is a view illustrating a component being the target of the interference check included in the respective groups. As illustrated in FIG. 8A, respective components constituting the group GrA, which are the hand 102A, the first finger 103A, and the second finger 104A, are included in an interference check group list 421a. Further, respective components constituting the group GrB, which are the small box BaA and the large box BbA, are included in an interference check group list 421b.

After executing the processing of step S2, the CPU 212 creates an interference check combination list (S3). In this processing, the screen processing unit 213 of the CPU 212 creates the interference check combination list based on the information of groups set by the processing of step S2 and the information of components included in each group, and stores the created interference check combination list in the storage apparatus 216.

FIG. 8B is an explanatory view of a combination list created from a group of components being the target of the interference check created in the example illustrated in FIGS. 7 and 8A. As described above, in the interference check, the interference check is performed between components belonging to groups by setting the groups, and there is a restriction that the interference check is not performed among components belonging to the same group. Based on the conditions regarding the restriction, the screen processing unit 213 creates an interference check combination list 430 illustrated in FIG. 8B, and stores the interference check combination list 430 being created in the storage apparatus 216 as the setting information of the interference check.

As illustrated in FIG. 8B, the interference check combination list 430 is created from a total of six patterns of combination of components having combined two components, wherein one component is included in the group GrA and one component is included in the group GrB.

After executing the processing of step S3, or in the processing of step S1, if it is determined that the interference group setting button 301 is not selected (No), the CPU 212 determines whether the interference threshold setting button 302 (refer to FIG. 5) has been selected (S4). In this processing, the CPU 212 determines whether to call the interference threshold setting screen based on the operation of the mouse 204 selecting the interference threshold setting button 302.

In the processing of step S4, if it is determined that the interference threshold setting button 302 has been selected (Yes), the CPU 212 sets a threshold for the component being the target of the interference check (S5). In this processing, the CPU 212 displays an interference threshold selection screen in response to the operation of the interference threshold setting button 302. Further, the screen processing unit 213 of the CPU 212 sets a threshold for performing the interference check for each of the components being the target of the interference check in response to the operation on the interference threshold selection screen.

Figure 9:
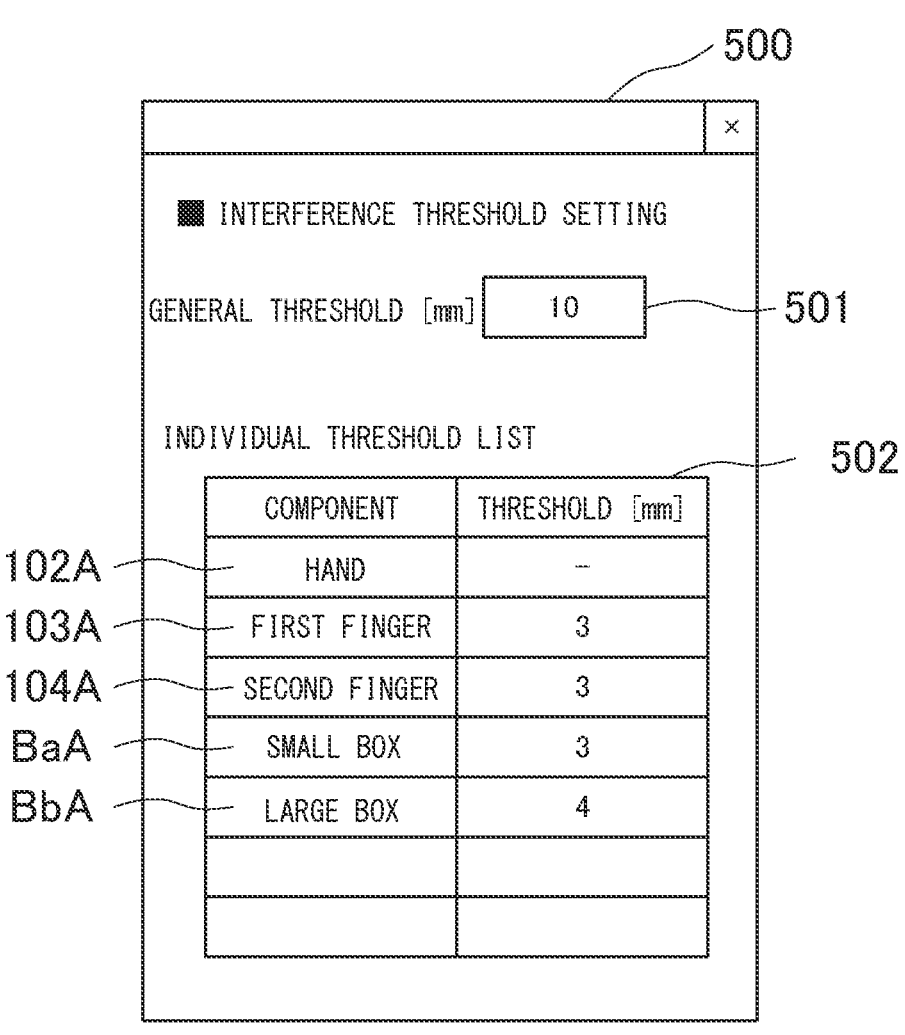
FIG. 9 is a view illustrating an interference threshold setting screen displayed on a display of the information processing apparatus according to the first embodiment of the present invention.

FIG. 9 is an explanatory view of an interference threshold setting screen 500 for setting thresholds of the components being the target of the interference check. As illustrated in FIG. 9, a general threshold setting 501 which is an area for setting a general threshold, which is set uniformly when an individual threshold is not set for each component, is displayed on the interference threshold setting screen 500. Further, an individual threshold setting list 502 which is an area for setting an individual threshold for each component is displayed on the interference threshold setting screen 500.

In a state where the general threshold setting 501 is selected by operating the mouse 204, the screen processing unit 213 sets the value entered through the keyboard 203 as the general threshold and also displays the value on the general threshold setting 501. In the example illustrated in FIG. 9, 10 mm is set as the general threshold.

At least all the components being the target of the interference check selected in the interference group setting are displayed in the individual threshold setting list 502. In a case where one of the components displayed in the individual threshold setting list 502 is selected by the operation of the mouse 204, the screen processing unit 213 sets the value entered through the keyboard 203 as an individual threshold of the component, and displays the value on the individual threshold setting list 502. In the example illustrated in FIG. 9, an individual threshold of 3 mm is set for each of the first finger 103A, the second finger 104A, and the small box BaA, and an individual threshold of 4 mm is set for the large box Bb.

In a state where the individual threshold is set as the threshold, the CPU 212 prioritizes the individual threshold over the general threshold as the threshold to be used for the interference check. Further, in a state where the individual threshold is not set as the threshold, the CPU 212 uses the general threshold as the threshold to be used for the interference check. Therefore, in the example illustrated in FIG. 9, the CPU 212 uses 10 mm, which is set as the general threshold, as the threshold of the hand 102A which does not have an individual threshold set thereto in the interference check. The information of the general threshold setting 501 and the information of the individual threshold setting list 502 set by the screen processing unit 213 are stored as the set threshold information by the CPU 212 in the storage apparatus 216.

By executing the processing of step S5, the information processing apparatus 200 according to the first embodiment sets an individual threshold or a general threshold for each of the components being the target of the interference check. In other words, according to the robot system 1 of the first embodiment, an individual threshold or a general threshold is set for all the components being the target of the interference check.

As described, the information processing apparatus 200 according to the first embodiment is formed to enable thresholds for performing the interference check to be set respectively as interference confirmation for confirming whether interference occurs at least between two components. Further, the information processing apparatus 200 is formed to enable a general threshold to be set uniformly for components that do not have an individual threshold set thereto. In the processing of step S5, the processing for setting the thresholds respectively for each of the components constitutes an individual threshold setting processing. Further, in the processing of step S5, the processing for setting a general threshold uniformly to the components that do not have an individual threshold set thereto constitutes a general threshold setting processing.

After executing the processing of step S5, the CPU 212 creates a threshold comparison list (S6). In this processing, the threshold comparison unit 214 of the CPU 212 acquires an interference check combination list serving as a setting information crated by the processing of step S3 and stored in the storage apparatus 216. Further, the threshold comparison unit 214 acquires the individual threshold and the general threshold which are threshold information created in the processing of step S5 and stored in the storage apparatus 216.

The threshold comparison unit 214 according to the first embodiment uses a first comparison condition in which a greater value between two thresholds is set as a threshold to be used for the interference check in a comparison condition, or predetermined condition, for comparing and setting threshold set for each of two components being the target of the interference check. The threshold comparison unit 214 sets the greater value between two thresholds set for each of the two components based on the first comparison condition as a threshold to be used, or predetermined threshold, that is used for the interference check, and creates the threshold comparison list.

Figure 10:
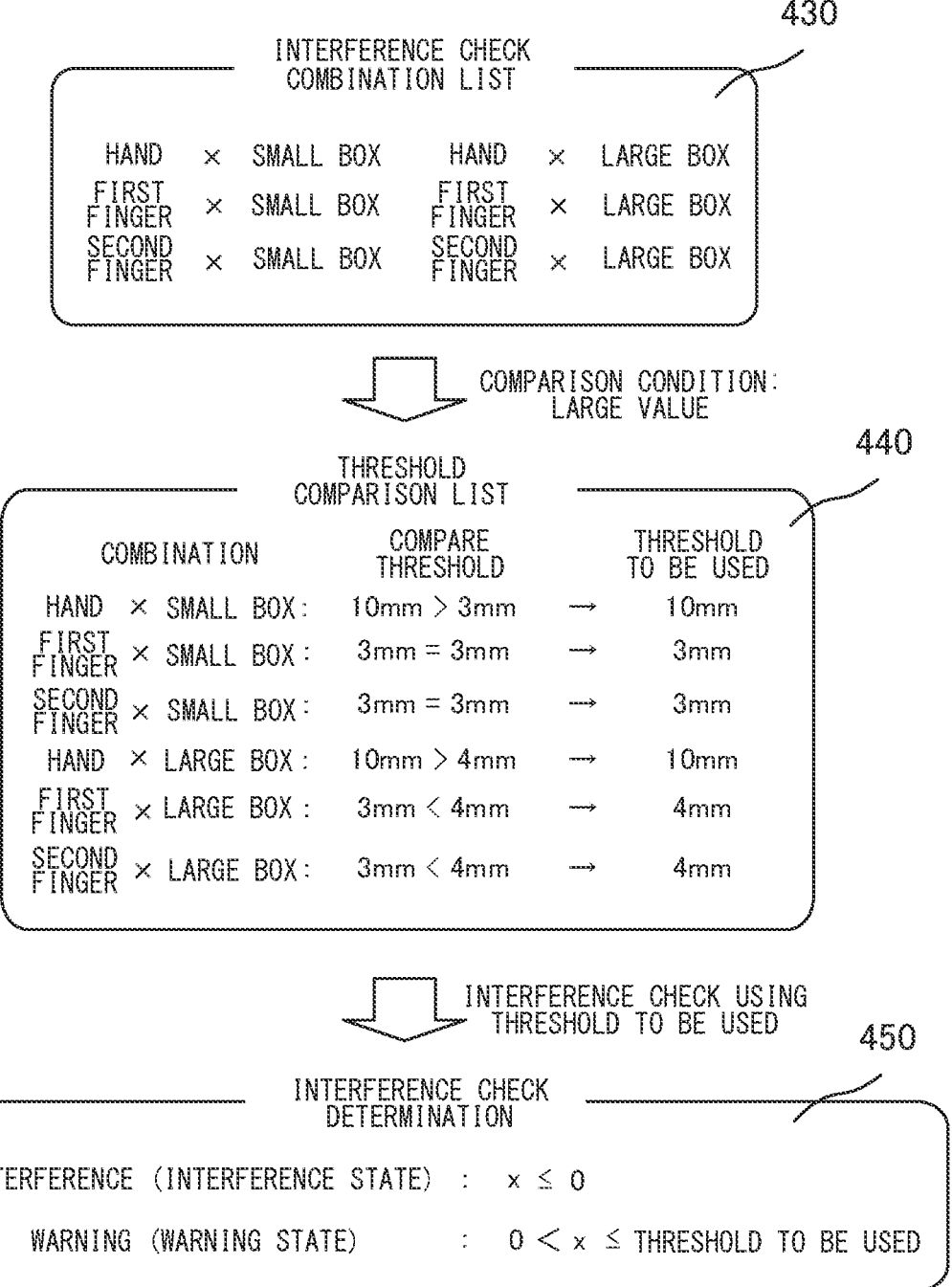
FIG. 10 is an explanatory view illustrating the interference check combination list created in the information processing apparatus, a threshold comparison list, and an interference check determination according to the first embodiment of the present invention.

FIG. 10 is an explanatory view illustrating the interference check combination list 430, a threshold comparison list 440 created based on the individual threshold and the general threshold, and an interference check determination 450 using the threshold comparison list 440. The interference check determination will be described in detail later.

As illustrated in FIG. 10, the threshold comparison unit 214 compares the thresholds set for each component for each of the combination of components included in the interference check combination list 430, and sets the greater value as the threshold used for the interference check, that is, threshold to be used. For example, regarding the hand 102A for which a 10 mm threshold is set and the small box BaA for which a 3 mm threshold is set, since the threshold of the hand 102A is greater than the threshold of the small box BaA, the threshold comparison unit 214 sets the threshold to be used to 10 mm. The threshold comparison unit 214 sets the threshold to be used for each of the combination of components included in the interference check combination list 430, and creates the threshold comparison list 440. The information regarding the threshold comparison list 440 being created is stored by the CPU 212 in the storage apparatus 216 as the information of the threshold to be used.

After executing the processing of step S6 or during the processing of step S4, if it is determined that the interference threshold setting button 302 has not been selected (No), the CPU 212 determines whether the interference check execution button 303 (refer to FIG. 5) has been selected (S7). In this processing, if it is determined that the interference check execution button 303 has not been selected (No), the CPU 212 determines that the starting of interference check has not been selected by the user, and returns the processing to step S1.

As described, the CPU 212 repeats the processing of steps S1 to S7 until the interference check execution button 303 is operated, to thereby enable a series of processing regarding the setting of the interference check to be executed in response to the operation of the user.

In the processing of step S7, if it is determined that the interference check execution button 303 has been selected (Yes), the CPU 212 moves each component within the virtual space V based on the movement data created in advance, and starts the interference check. Each time the display of the virtual space V is updated, the CPU 212 executes the processing of steps S8 to S10 serving as interference confirmation processing.

In the interference check, at first, the CPU 212 causes the interference calculation unit 215 to execute the interference check determination (S8). In this processing, the interference calculation unit 215 calculates the distance between components constituting the interference check combination list 430 in the virtual space V at the point of time when the processing of step S8 is executed, and executes the interference check determination 450 using the threshold comparison list 440.

As illustrated in FIG. 10, the interference calculation unit 215 performs an interference check capable of determining two kinds of states, which are interference, or interference state, and warning, or warning state. In a state where the result having calculated the distance between components is greater than 0 and equal to or smaller than the threshold to be used set in the threshold comparison list 440, the interference calculation unit 215 outputs a warning state, and the CPU 212 stores the warning state in the storage apparatus 216. Further, in a state where the result having calculated the distance between components is 0 or smaller, the interference calculation unit 215 outputs an interference state, and the CPU 212 stores the interference state in the storage apparatus 216.

After executing the processing of step S8, the CPU 212 displays the result of the interference check (S9). In this processing, the CPU 212 acquires the result calculated in the processing of step S8 from the storage apparatus 216, causes the screen processing unit 213 to execute a screen drawing process and cause the result of the interference check to be drawn in the virtual space V. The screen processing unit 213 notifies whether or not the state is an interference state or a warning state by drawing the presence or absence of interference in a manner easily recognized by the user as a screen displayed in the virtual space V.

For example, the screen processing unit 213 can maintain the display color of the component not determined to be in the interference state or the warning state to a display color prior to the interference check and change the display color of the component that has been determined to be in the interference state or the warning state. Further, the screen processing unit 213 can maintain a texture of the component that has not been determined to be in the interference state or the warning state to the texture prior to the interference check and change the texture of the component that has been determined to be in the interference state or the warning state. Further, the screen processing unit 213 can use the display of a list displaying message boxes and states to display the name of the component that has been determined to be in the interference state or the warning state. In these displays, the screen processing unit 213 can be configured to display the interference state and the warning state in a state where the user can distinguish the two states.

After executing the processing of step S9, the CPU 212 determines whether the movement of each component within the virtual space V based on the movement data has been completed (S10). In this processing, if it is determined that the movement of each component within the virtual space V based on the movement data is not completed (No), the CPU 212 returns the processing to step S8. Meanwhile, if it is determined that the movement of each component within the virtual space V based on the movement data has been completed (Yes), the CPU 212 determines that the interference check in a state where the respective components are moved based on the movement data has been completed, and ends the interference check.

Summary of First Embodiment

As described, the information processing apparatus 200 according to the first embodiment is capable of setting an individual threshold for each of the components being the target of the interference check. Further, the information processing apparatus 200 sets the greater one of the thresholds set for the components being the target of the interference check and the comparison condition as the threshold to be used, and executes the interference check. Thereby, the information processing apparatus 200 can set the distance between components being the target of the interference check to an appropriate distance.

Therefore, the robot system 1 according to the first embodiment can cut down excessive values from the thresholds required to avoid interference between components in the movement of the robot apparatus 100, and to move the robot apparatus 100 with minimum threshold. Thereby, the productivity of operation of the robot system 1 can be improved.

Further according to the information processing apparatus 200 of the first embodiment, when setting thresholds for each of the plurality of components being the target of the interference check, there is no need to set a threshold of one component based on a different component, such that the number of steps regarding the setting of thresholds can be cut down. Therefore, the information processing apparatus 200 can cut down the work time of the user required to change thresholds of the components or to confirm the operation after changing the thresholds.

Second Embodiment

Next, an information processing apparatus 200 according to a second embodiment will be described. The information processing apparatus 200 according to the second embodiment is composed so that the user can select, among multiple kinds of comparison conditions, a comparison condition for comparing thresholds set respectively for two components being the target of the interference check. The information processing apparatus 200 according to the second embodiment differs in this point from the first embodiment described above. The other configurations are similar to the first embodiment, such that components that are similar to the first embodiment are denoted with the same reference numbers and control processing that are similar to the first embodiment are denoted with the same step numbers, and the descriptions thereof are omitted.

Selection of Comparison Condition

Figure 11:
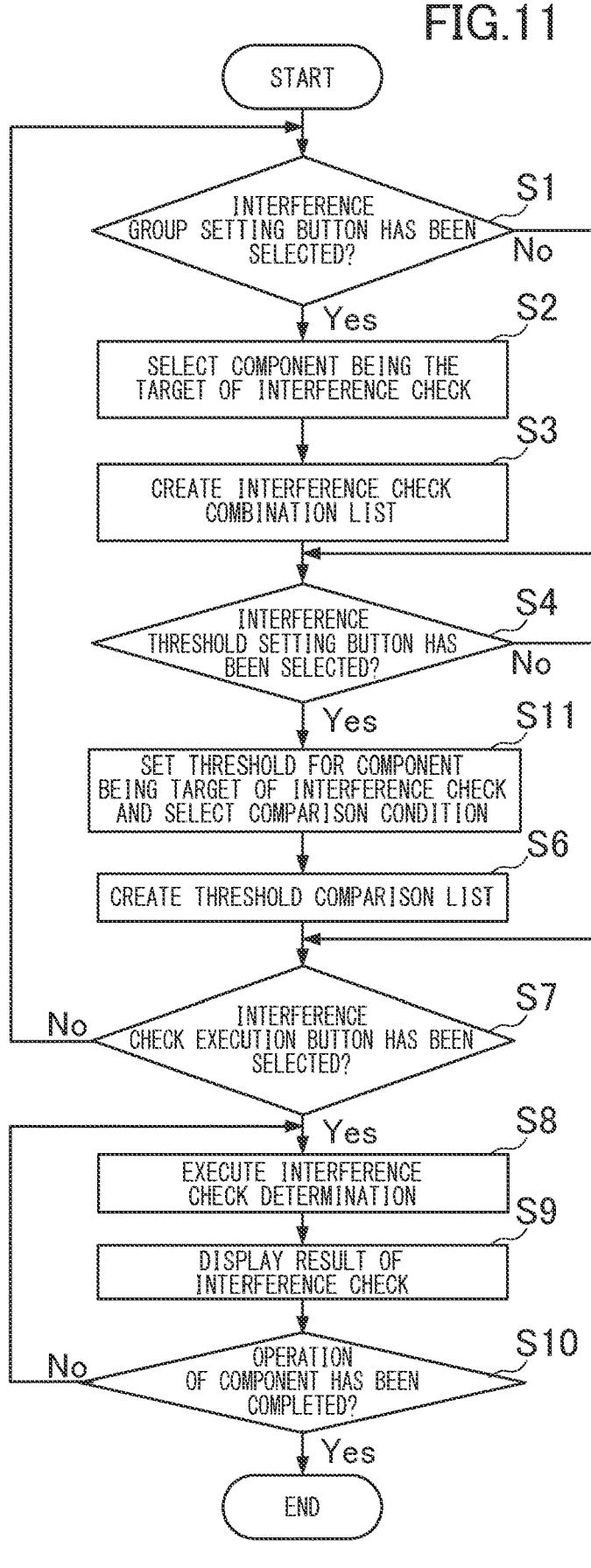
FIG. 11 is a flowchart illustrating an interference check executed by an information processing apparatus according to a second embodiment of the present invention.

FIG. 11 is a flowchart illustrating an interference check executed by the CPU 212 of the information processing apparatus 200 according to the second embodiment.

In the processing of step S4, if it is determined that the interference threshold setting button 302 has been selected (Yes), the CPU 212 executes the setting of threshold for the components being the target of the interference check and the setting of the comparison condition of the threshold (S11). In this processing, in response to the operation of the interference threshold setting button 302, the CPU 212 displays the interference threshold selection screen. Further, in response to the operation on the interference threshold selection screen, the screen processing unit 213 of the CPU 212 sets a threshold for performing the interference check for each of the components being the target of the interference check. The screen processing unit 213 sets the comparison condition for comparing thresholds set for each of the two components being the target of the interference check in response to the operation on the interference threshold selection screen.

Figure 12:
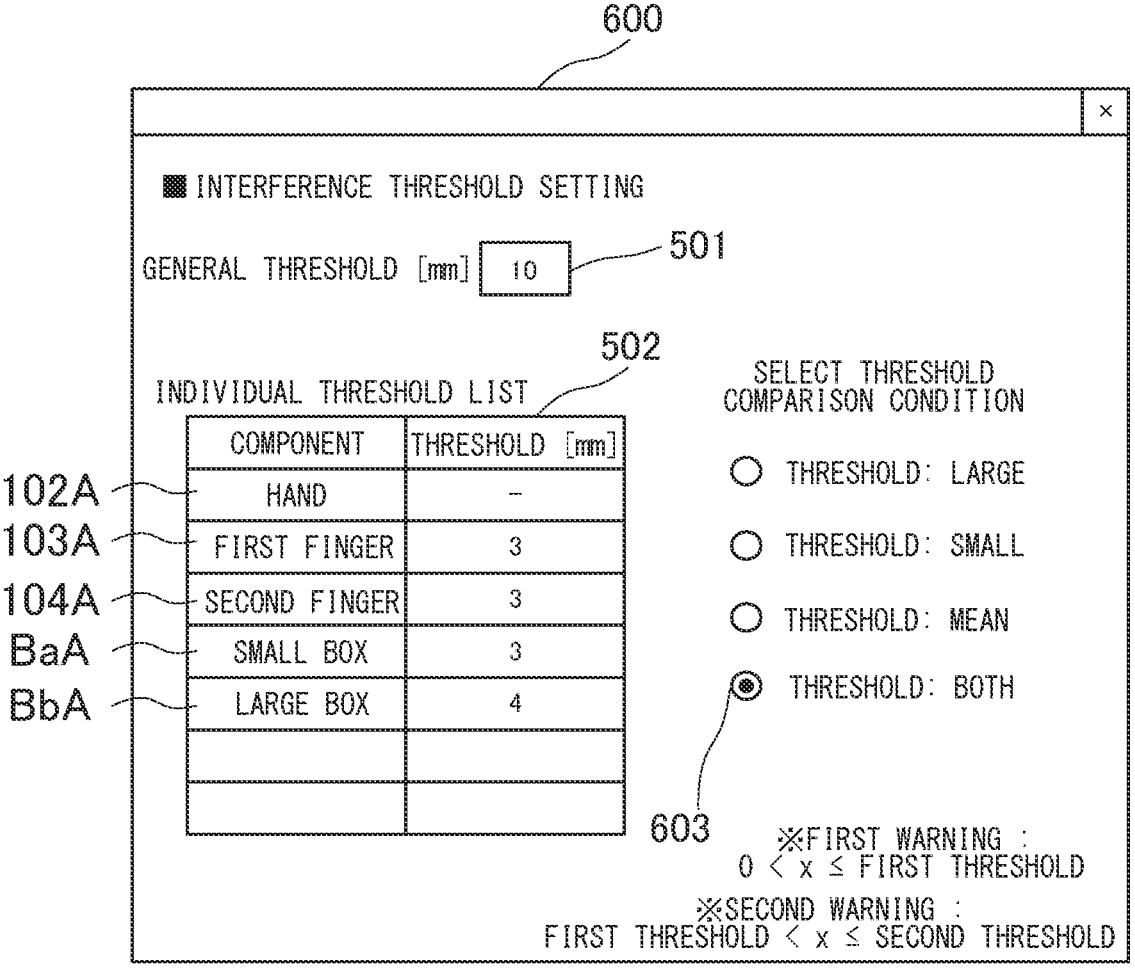
FIG. 12 is a view illustrating an interference threshold setting screen displayed on a display of the information processing apparatus according to the second embodiment of the present invention.

FIG. 12 is an explanatory view of the interference threshold setting screen 500 for setting the thresholds of the components being the target of the interference check and a comparison condition for comparing the thresholds set respectively for the two components being the target of the interference check. As illustrated in FIG. 12, the general threshold setting 501, the individual threshold setting list 502, and a threshold comparison condition selection unit 603 are displayed on the interference threshold setting screen 500. A first comparison condition button 603a, a second comparison condition button 603b, a third comparison condition button 603c, and a fourth comparison condition button 603d, each composed of a radio button, are displayed in the threshold comparison condition selection unit 603.

As described above, the first comparison condition is a comparison condition in which, when comparing the thresholds set respectively for the two components being the target of the interference check, the threshold having the greater value is set as the threshold used for the interference check, which is set by having the first comparison condition button 603a selected.

A second comparison condition is a comparison condition in which, when comparing the thresholds set respectively for the two components being the target of the interference check, the threshold having the smaller value is set as the threshold used for the interference check, which is set by having the second comparison condition button 603b selected. For example, in a state where the second comparison condition is selected, the threshold of the hand 102A is set to 10 mm, and the threshold of the small box BaA is set to 3 mm, the threshold comparison unit 214 sets a value of 3 mm as the threshold to be used in the interference check.

A third comparison condition is a comparison condition in which, when comparing the thresholds set respectively for the two components being the target of the interference check, a mean value of two thresholds is set as the threshold used for the interference check, which is set by having the third comparison condition button 603c selected. For example, in a state where the third comparison condition is selected, the threshold of the hand 102A is 10 mm, and the threshold of the small box BaA is 3 mm, the threshold comparison unit 214 sets a value of 6.5 mm as a mean value of the threshold to be used in the interference check.

A fourth comparison condition is a comparison condition in which, when comparing the thresholds set respectively for the two components being the target of the interference check, a small value is set as a first threshold and a large value is set as a second threshold used for the interference check. The fourth comparison condition is set by having the fourth comparison condition button 603d selected.

The screen processing unit 213 determines to use the selected comparison condition for the comparison of thresholds by having any one of the radio buttons displayed in the threshold comparison condition selection unit 603 selected through the operation of the mouse 204. Further, by having a radio button that differs from the currently selected radio button selected through the operation of the mouse 204, the screen processing unit 213 switches the comparison condition being used.

In a state where a work is gripped and subjected to operation by the robot apparatus 100, there is a case where vibration varies during the movement of the arm 101, the hand 102, and the work, depending on the weight of the work being gripped. Therefore, in a case where a plurality of works having different weights are gripped and conveyed by the robot apparatus 100, for example, it is preferable to allow a clearance to be varied depending on the section of the movement data.

Examples in which each of the first to fourth comparison conditions are used preferably will be described below. The first comparison condition is a condition that is preferable in a case where a work that has a center of gravity positioned at a position that differs from a position on an extended line of an end effector of the robot apparatus and that has a heavy weight is gripped, and the work is moved at a high velocity compared to a predetermined velocity within the velocity range capable of being output by the robot apparatus. When gripping and moving such a work in the robot system, if the movement of the work by the robot apparatus is stopped, the end effector at the end of the robot apparatus when the work is stopped may vibrate significantly. Therefore, in the robot system, a first comparison condition is selected in consideration of the amplitude of vibration.

The second comparison condition is a condition that is preferable in a case where a work that has a light weight is gripped, and the work is moved at a low velocity compared to the predetermined velocity within the velocity range capable of being output by the robot apparatus. When gripping and moving such a work in the robot system, if the movement of the work by the robot apparatus is stopped, the vibration at the tip of the robot apparatus being stopped tends to vibrate less, and there is less probability of components colliding against one another, such that the second comparison condition is selected.

By setting the second comparison condition and performing the interference check, the robot system 1 can move the robot apparatus 100 with a minimum threshold for movement, and the productivity of the operation performed by the robot system 1 can be improved.

The third comparison condition is a condition that is preferable in a case where a work that has a lighter weight compared to when the first comparison condition is selected and that has a position of center of gravity at a position close to the extended line of the end effector compared to when the first comparison condition is selected is moved at a higher velocity than the predetermined velocity within a predetermined velocity range capable of being output by the robot apparatus. When gripping and moving such a work in the robot system, if the movement of the work by the robot apparatus is stopped, the amplitude of vibration of the tip of the robot apparatus when the work is stopped is small compared to the case where the first comparison condition is preferable, such that the third comparison condition is selected.

By setting the third comparison condition and performing the interference check, the robot system 1 can move the robot apparatus 100 at a high velocity and with a minimum necessary threshold, such that the productivity of operation of the robot system 1 can be improved.

The fourth comparison condition is a condition that is preferable in a case where which of the first comparison condition and the second comparison condition causes a warning state is confirmed and a velocity of the robot apparatus is set. In the robot system, if it is determined that the second threshold causes a warning state and that the first threshold does not cause a warning state based on an interference check for setting the fourth comparison condition, the user can recognize that interference is avoidable by slowing the velocity, such that the velocity can be set accordingly.

Figure 13:
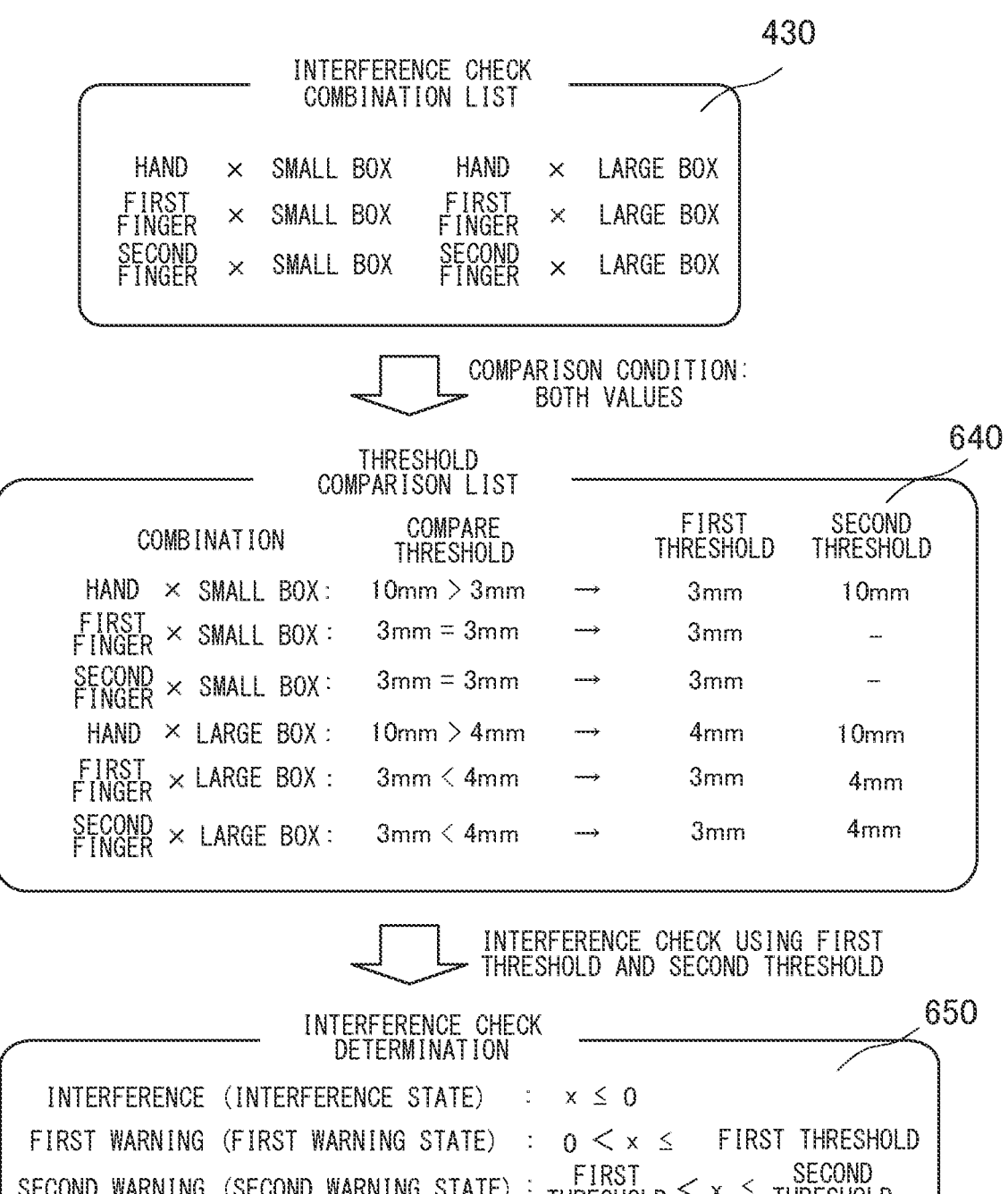
FIG. 13 is an explanatory view illustrating an interference check combination list created in the information processing apparatus, a threshold comparison list, and an interference check determination according to the second embodiment of the present invention.

Details of a case where the fourth comparison condition has been set will be described with reference to FIG. 13. FIG. 13 is an explanatory view illustrating an interference check combination list, a threshold comparison list created based on an individual threshold, a general threshold, and a fourth comparison condition, and an interference check determination result. As illustrated in FIG. 13, the threshold comparison unit 214 compares the thresholds set for the respective components for each of the combination of components included in the interference check combination list 430. The threshold comparison unit 214 sets the smaller value of the two thresholds as the first threshold and sets the greater value as the second threshold. For example, regarding the hand 102A whose threshold is set to 10 mm and the small box BaA whose threshold is set to 3 mm, the threshold comparison unit 214 sets 3 mm as the first threshold and sets 10 mm as the second threshold.

Further, if the two thresholds are of the same value, the threshold comparison unit 214 only sets the first threshold and does not set the second threshold. For example, regarding the first finger 103A whose threshold is set to 3 mm and the small box BaA whose threshold is set to 3 mm, the threshold comparison unit 214 sets 3 mm as the first threshold and does not set any value as the second threshold.

The threshold comparison unit 214 sets the first threshold and the second threshold for each of the combination of components for which different thresholds are set among the combination of components included in the interference check combination list 430. Further, the threshold comparison unit 214 sets the first threshold for each of the combination of components for which the same threshold value is set among the combination of components included in the interference check combination list 430. Then, the threshold comparison unit 214 creates a threshold comparison list 640. The information of the threshold comparison list 640 being created is stored by the CPU 212 in the storage apparatus 216 as information of the threshold to be used.

In a state where the first threshold and the second threshold are set as the thresholds, the interference calculation unit 215 performs an interference check capable of determining three kinds of states, which are interference, or interference state, a first warning, or first warning state, and a second warning, or second warning state. In a state where the result having calculated the distance between components is greater than 0 and equal to or smaller than the first threshold set in the threshold comparison list 640, the interference calculation unit 215 outputs a first warning state and causes the CPU 212 to store the state in the storage apparatus 216. Further, in a state where the result having calculated the distance between components is greater than the first threshold and equal to or smaller than the second threshold set in the threshold comparison list 640, the interference calculation unit 215 outputs a second warning state and causes the CPU 212 to store the state in the storage apparatus 216. If the result having calculated the distance between components is 0 or smaller, the interference calculation unit 215 outputs an interference state and causes the CPU 212 to store the state in the storage apparatus 216.

In a state where the interference check result is a first warning state, the information processing apparatus 200 executes a first notification notifying the user by displaying that the state is a first warning state on the display 202. Further, in a state where the interference check result is a second warning state, the information processing apparatus 200 executes a second notification notifying the user by displaying that the state is a second warning state on the display 202.

Summary of Second Embodiment

As described, the information processing apparatus 200 according to the second embodiment is capable of setting an individual threshold for each of the components being the target of the interference check. Further, the information processing apparatus 200 enables the user to select a comparison condition to be used for comparing thresholds of components for setting the threshold to be used for the interference check from among first to fourth comparison conditions. Thereby, the information processing apparatus 200 can set the threshold to be used according to the movement status of the components being the target of the interference check or the object of the user executing the interference check, and to set the distance between components being the target of the interference check to an appropriate distance.

Therefore, the robot system 1 according to the second embodiment can cut down excessive values from the thresholds required to avoid interference between components in the movement of the robot apparatus 1X), and to move the robot apparatus 100 with minimum threshold. Thereby, the productivity of operation of the robot system 1 can be improved.

Third Embodiment

Next, an information processing apparatus 200 according to a third embodiment will be described. The information processing apparatus 200 according to the second embodiment described above enables the user to select among multiple kinds of comparison conditions a comparison condition for comparing thresholds set for each of the two components being the target of the interference check. The present embodiment illustrates in detail a form for automatically selecting which threshold to be used between thresholds set respectively for the two components being the target of the interference check by the information processing apparatus 200. Vibration may occur during movement of the arm 101, which is caused by inertia force acting by velocity or weight of the tip of the arm. Therefore, the threshold of the interference check is required to be varied according to a movement velocity of the arm 101. The present embodiment illustrates a form of automatic selection of threshold of the interference check according to the movement velocity of the arm 101. The other configurations are similar to the first and second embodiments, such that the components similar to the first and second embodiments are denoted with the same reference numbers and control processes similar to the first embodiment are denoted with the same step numbers, and descriptions thereof are omitted.

Figure 14:
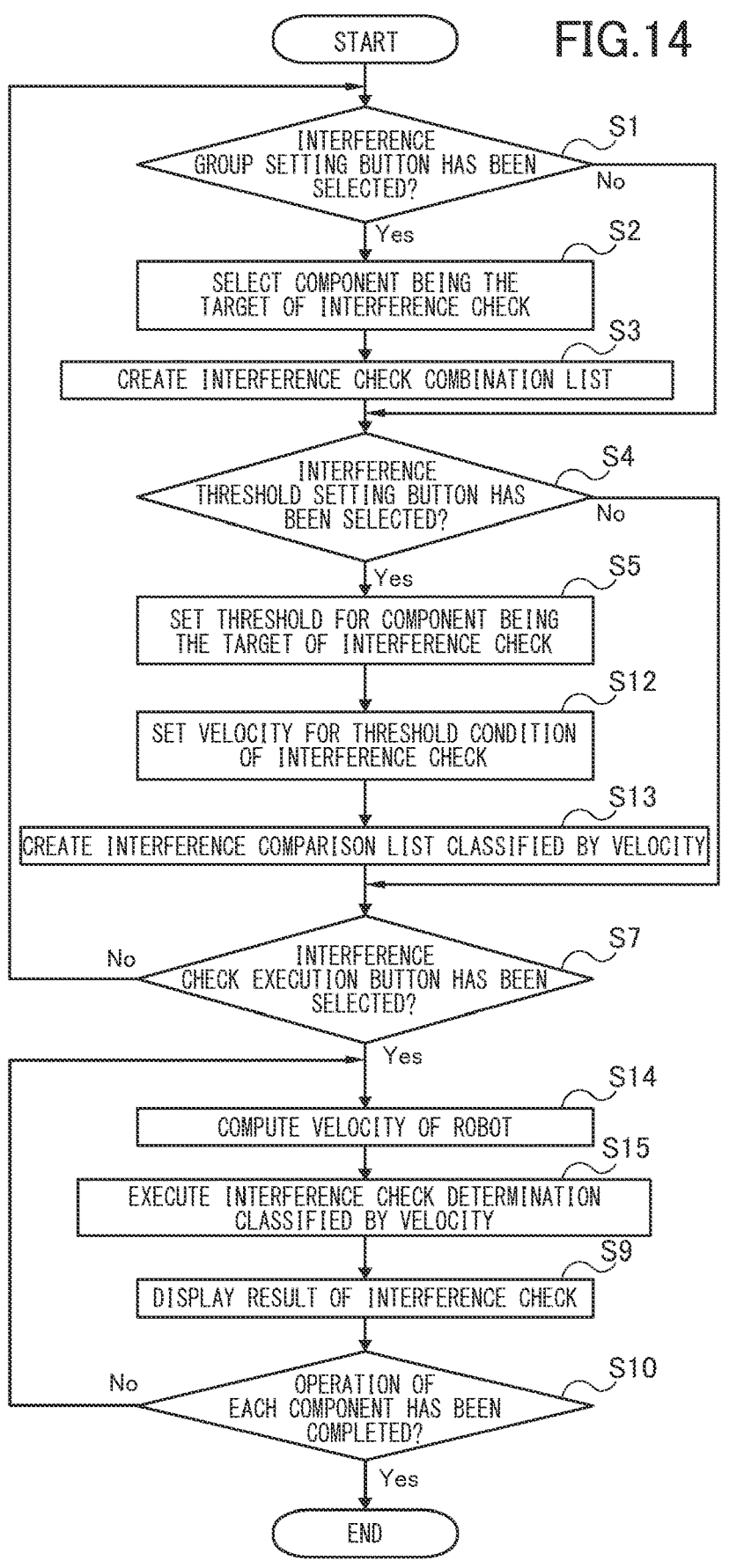
FIG. 14 is a flowchart illustrating an interference check executed by an information processing apparatus according to a third embodiment of the present invention.

FIG. 14 is a flowchart illustrating an interference check executed by the CPU 212 of the information processing apparatus 200 according to the present embodiment. Based on FIG. 14, in the processing of step S4, if it is determined that the interference threshold setting button 302 is selected (Yes), the CPU 212 executes a setting of threshold of components being the target of interference check (S5). Further, setting of upper limit of velocity regarding a threshold condition of interference check (S12) and creation of an interference comparison list per velocity (S13) are executed. In this processing, the CPU 212 displays an interference threshold selection screen 700 illustrated in FIG. 15 in response to the operation of the interference threshold setting button 302. Further, the screen processing unit 213 of the CPU 212 sets a threshold for performing an interference check for each of the components being the target of the interference check according to the operation performed on the interference threshold selection screen 700. The screen processing unit 213 sets up a threshold switching velocity according to the operation on the interference threshold selection screen 700.

Figure 15:
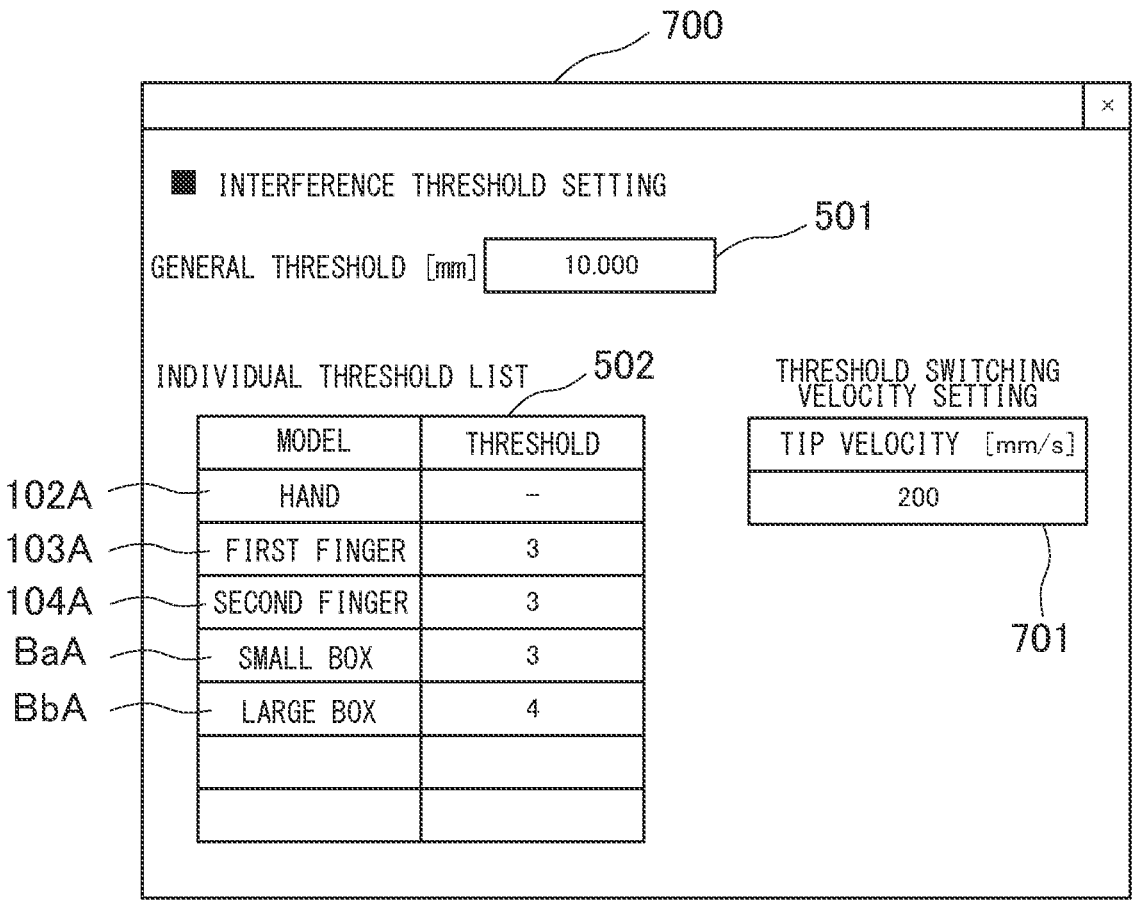
FIG. 15 is a view illustrating an interference setting screen displayed on a display of the information processing apparatus according to the third embodiment of the present invention.

FIG. 15 is a flowchart illustrating the interference threshold selection screen 700 according to the present embodiment. The interference threshold selection screen 700 enables to execute setting of thresholds of components being the target of the interference check and setting of a threshold switching velocity for switching the threshold conditions set for each of the two components being the target of the interference check according to the velocity of the arm 101. As illustrated in FIG. 15, the general threshold setting 501, the individual threshold setting list 502, and a threshold switching velocity setting 701 are displayed on the interference threshold selection screen 700. A value of a tip velocity of the arm 101, i.e., movement velocity of the hand 102, for switching the threshold to be used between the first threshold and the second threshold described in the second embodiment is set in the threshold switching velocity setting 701. In the present embodiment, "mm/s" is illustrated as an example of the unit of tip velocity, but the unit is not limited thereto. For example, "m/s" or "cm/s" can also be used.

Returning to FIG. 14, velocity condition regarding the threshold condition of interference check is set in step S12. The user enters a numerical value of tip velocity of the arm 101 of the robot in the threshold switching velocity setting 701. In the example of FIG. 15, "200 mm/s" is set.

Next, in step S13, an interference check determination list classified by velocity is created. FIG. 16 is an example of the interference check determination list classified by velocity according to the present embodiment. The interference check determination list classified by velocity is described with reference to FIG. 16. In FIG. 16, the interference check combination list 430 and the threshold comparison list 640 are similar to the first and second embodiments. An interference check determination classified by velocity 750 is created based on the threshold comparison list 640 and set velocity vel set in the threshold switching velocity setting 701. According to the present embodiment, in a case where the velocity is +200 mm/s when the tip velocity is set to 200 mm/s, the warning executes the interference check using the first threshold. In a case where the velocity exceeds ±200 mm/s, the warning executes the interference check using the second threshold. Regarding the tip velocity set in this manner, in a case where the tip velocity of the arm 101, that is, movement velocity of the hand 102, is within a set value range, the smaller threshold is used. In a case where the tip velocity of the arm 101, that is, movement velocity of the hand 102, exceeds the set value range, the greater threshold is used. Thereby, in a movement in which the tip velocity is high, vibration tends to occur at the tip portion of the arm 101, that is, the hand 102, and interference may occur due to unexpected movement. Therefore, by setting a strict clearance in the determination of interference, the probability of interference in a real machine can be reduced.

Returning to FIG. 14, in a state where the interference check button is selected in step S7, the CPU 111 calculates the tip velocity of the arm 101, or movement velocity of the hand 102, in the operation set for the arm 101 of the robot in step S14.

Next, in step S15, the interference check determination classified by velocity is executed with respect to the calculated velocity, and in step S9, a processing for displaying the interference check result by step S15 is executed, before the flow is ended.

Summary of Third Embodiment

As described, the information processing apparatus 200 according to the third embodiment can automatically change warning conditions regarding interference based on the velocity of the robot. Thereby, in a case where the clearance for determining interference is required to be set to a strict value due to a movement of the robot by which vibration tends to occur, a threshold with a strict clearance can be set automatically, according to which the burden on the user can be reduced.

According to the present embodiment, an example regarding the tip velocity was described, but the present technique is not limited thereto. For example, a speed of rotation of a certain joint of the arm 101 can beset as a condition for switching thresholds. Further, a speed for changing the position of the hand 102 itself can be set as a condition for switching thresholds.

Figure 17:
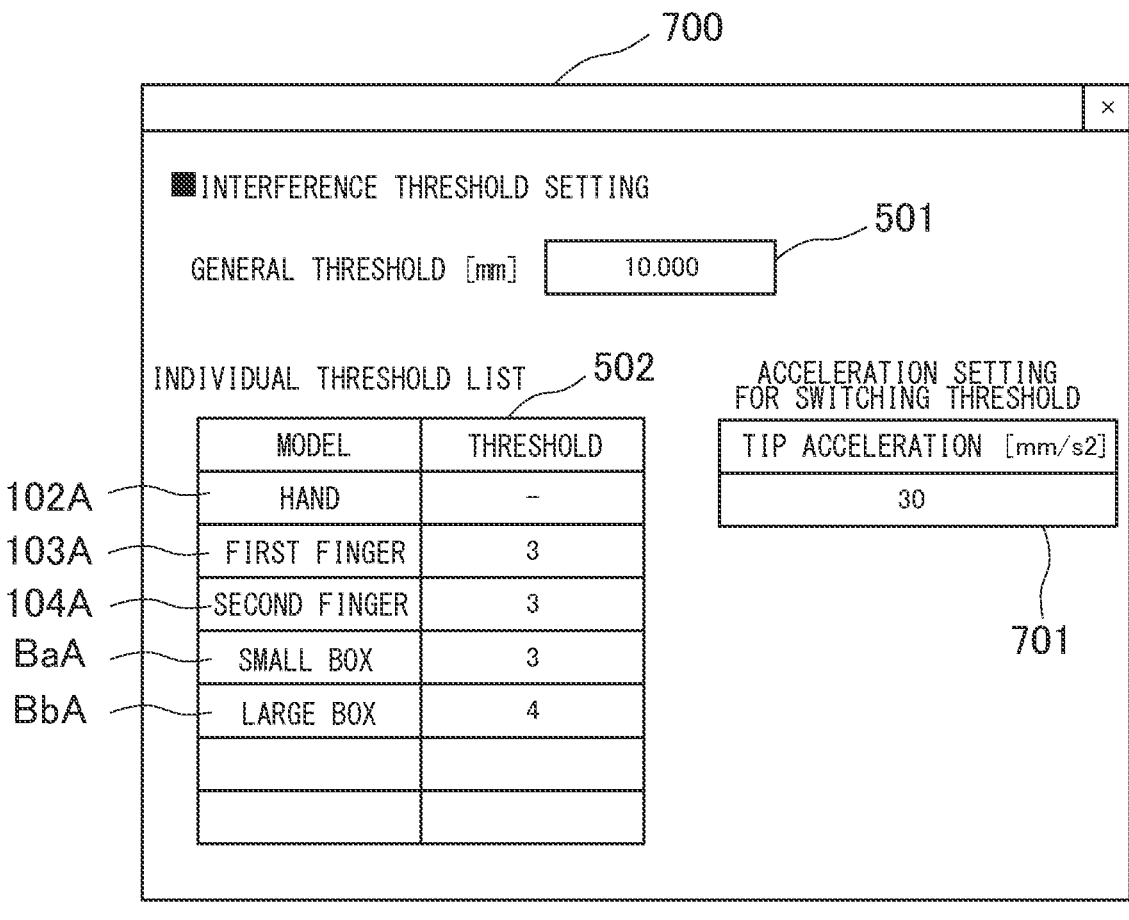
FIG. 17 is a view illustrating an interference threshold setting screen displayed on a display of the information processing apparatus according to the third embodiment of the present invention.

Further, since the vibration of the tip portion of the arm 101 tends to occur at an accelerating or decelerating timing, such that acceleration can be set as illustrated in FIG. 17. In FIG. 17, a tip acceleration of 30 mm/s2 is set. The interference check in a state where the acceleration is set is similar to the example of FIG. 16, wherein if the acceleration is within ±30 mm/s2 regarding the tip velocity set to 30 mm/s2, the warning executes an interference check using the first threshold. If the acceleration exceeds 30 mm/s2, the warning executes an interference check using the second threshold. Further, a value of force that acts on the tip of the arm 101, i.e., centrifugal force, calculated based on the acceleration can be set as a condition for switching thresholds. The setting of acceleration and force, i.e., centrifugal force, is performed based on the tip of the arm 101, but the present technique is not limited thereto. It can be the acceleration or the force, i.e., centrifugal force, of a predetermined joint of the arm 101 or it can be the acceleration or the force, i.e., centrifugal force, when changing the position of the hand 102 itself.

Figure 18:
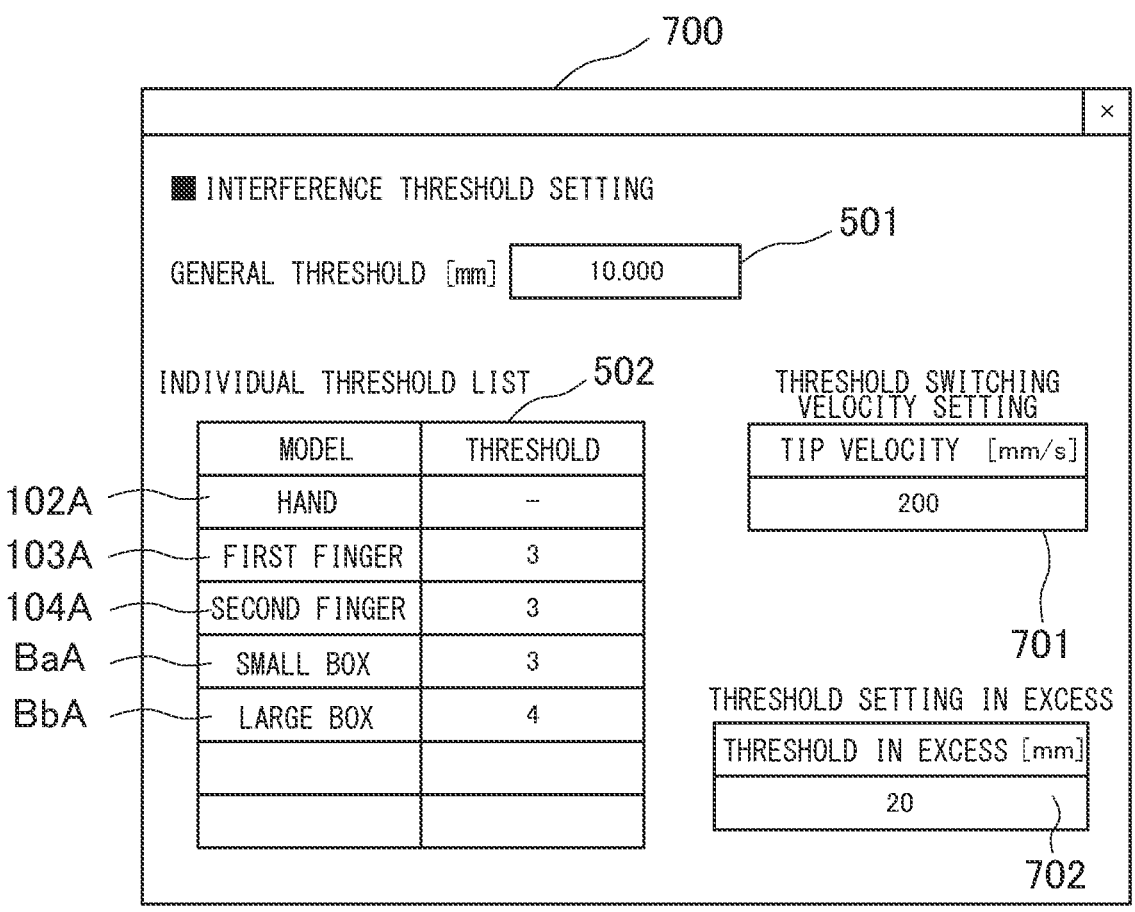
FIG. 18 is a view illustrating an interference threshold setting screen displayed on a display of the information processing apparatus according to the third embodiment of the present invention.

According to the present embodiment, if the range of value of the set velocity, or acceleration, or force, was exceeded, the greater value between the thresholds set for the two components being the target of interference was selected as a threshold, i.e., second threshold, for determining the warning. However, as illustrated in FIG. 18, a threshold to be used when the range of set velocity, or acceleration, or force, was exceeded can be set to a fixed value. In FIG. 18, a threshold setting in excess 702 is displayed on the interference threshold selection screen 700, and a threshold of 20 mm is set. Thereby, in a movement that exceeds the range of value of the set velocity, or acceleration, or force, 20 mm is set as the second threshold, and a warning is output.

Other Embodiments

In the first to third embodiments, the robot apparatus 100 is designed to grip the work, or target object, by finger portions, which are the first finger 103 and the second finger 104, but the present technique is not limited thereto. The robot apparatus 100 can be designed to have a suction mechanism using air provided on the hand 102, and to suck the work using the suction mechanism.

Further, in the first to third embodiments, the information processing apparatus 200 is designed to execute the interference check between two components, but the present technique is not limited thereto. The information processing apparatus 200 can be configured to execute the interference check among three or more components.

In such a configuration, in a case where a fourth comparison condition is set as the comparison condition, the information processing apparatus 200 can be configured to set the smallest value of the thresholds of the respective components as the first threshold and to set the second smallest value of the first threshold as the second threshold.

According to the first to third embodiments, the information processing apparatus 200 moves the components within the virtual space V based on the movement data created in advance, and performs an interference check of calculating the distance between target objects each time the screen on the display 202 is updated, but the present technique is not limited thereto. The information processing apparatus 200 can be configured to execute the interference check of calculating the distance between target objects based on the positions of respective components stopped within the virtual space V at a point of time when the interference check execution button 303 was operated. In other words, the information processing apparatus 200 can be configured so that the movement data is not always necessary when executing the interference check.

According to further to the first to third embodiments, the information processing apparatus 200 executes the interference check by the interference check execution button 303 being operated, but the present technique is not limited thereto. The information processing apparatus 200 can be configured to be executed at all times by being designed to execute the interference check at the start of the apparatus. Further, the information processing apparatus 200 can be designed to perform an interference check per command value of each sampling time with a command value data created by the execution of the program serving as input, to save the result in a set with the command value data, and to enable the result to be confirmed as video.

According to the first to third embodiments, the information processing apparatus 200 determines that the state is a warning state in the interference check in which the distance between components being the target of the interference check is greater than 0 and equal to or smaller than the threshold to be used, but the present technique is not limited thereto. The information processing apparatus 200 can be designed to determine that it is a warning state when the distance between components being the target of the interference check is greater than 0 and smaller than the threshold to be used, and to determine that it is not a warning state when the distance is equal to or greater than the threshold to be used.

Further, in a state where the fourth comparison condition is selected, the information processing apparatus 200 outputs a first warning state if the distance between components is greater than 0 and equal to or smaller than the first threshold and outputs a second warning state if the distance is greater than the first threshold and equal to or smaller than the second threshold, but the present technique is not limited thereto. In a state where the fourth comparison condition is selected, the information processing apparatus 200 can be designed to output a first warning state if the distance between components is greater than 0 and smaller than the first threshold and output a second warning state if the distance is equal to or greater than the first threshold and smaller than the second threshold.

The information processing method and the information processing apparatus according to the present invention can be applied, in addition to production facilities, to designing of software and creating of programs for various machines and facilities such as industrial robots, service robots, and processing machineries that are operated by numerical value control using a computer. For example, the present technique can be applied to machines and facilities that can perform automatic operations such as expansion and contraction, bending and stretching, moving up and down, moving right and left, and revolving, or a combination of such operations, based on the information from a storage apparatus provided in the control apparatus.

Further, a program for realizing one or more functions of the embodiments described above can be supplied to a system or an apparatus via a network or a storage medium and realized by a processing performed by one or more processors of the computer of the system or the apparatus read and execute the program. Furthermore, it can be realized by a circuit for realizing one or more functions, such as an ASIC.

The present technique is not limited to the embodiments described above, and various modifications are made possible within the technical scope of the present invention. For example, the different embodiments described above can be realized in combination. Further, effects described in the embodiments are mere examples of preferable effects that are exerted by the present technique, and the effects of the present technique are not limited to those described in the embodiments.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-108081, filed Jul. 5, 2022 and Japanese Patent Application No. 2023-91095, filed Jun. 1, 2023, which are hereby incorporated by reference herein in their entirety.

What is claimed is:

1. An information processing method executed by a processor and a memory for performing an interference confirmation between a robot and an object by a simulation in a virtual space, the information processing method comprising:

setting a first threshold for the robot and setting a second threshold for the object by the processor and the memory;

performing the interference confirmation by selecting either the first threshold or the second threshold, wherein, in the interference confirmation, an interference notification is performed by the processor and the memory in a case where a distance of the robot and the object is equal to or less than a smaller value between the first threshold and the second threshold; and outputting a control data for avoiding an interference between the robot and the object based on the interference confirmation executed by using the first threshold or the second threshold through the simulation.

2. The information processing method according to claim 1, wherein, in a case where a plurality of objects exist in the virtual space, and a threshold for performing an interference confirmation to the plurality of objects is not set, a predetermined value is set as the threshold for the plurality of objects by the processor and memory.

3. The information processing method according to claim 1, wherein the interference confirmation is executed when moving at least one of the robot and the object.

4. The information processing method according to claim 1, wherein a greater value between the first threshold and the second threshold is set as the threshold to be used for the interference confirmation by the processor and the memory.

5. The information processing method according to claim 1, wherein a smaller value between the first threshold and the second threshold is set as the threshold to be used for the interference confirmation by the processor and the memory.

6. The information processing method according to claim 1, wherein a mean value of the first threshold and the second threshold is set as the threshold to be used for the interference confirmation by the processor and the memory.

7. The information processing method according to claim 1, wherein, in the interference confirmation, the interference notification is performed by the processor and the memory in a case where a distance between the robot and the object is greater than the smaller value of the first threshold and the second threshold and equal to or less than the greater value of the first threshold and the second threshold.

8. The information processing method according to claim 1, wherein, in a case where the first threshold and the second threshold are of a same value, either the first threshold or the second threshold is selected as the threshold to be used for the interference confirmation by the processor and the memory.

9. The information processing method according to claim 1, further comprising executing a setting processing of setting a predetermined condition by the user.

10. The information processing method according to claim 1, wherein the threshold to be used for the interference confirmation is automatically selected from the first threshold and the second threshold by the processor and the memory.

11. The information processing method according to claim 1, wherein the threshold to be used for the interference confirmation is automatically selected by the processor and the memory from the first threshold and the second threshold based on a movement of one of the robot and the object.

12. The information processing method according to claim 1, wherein the threshold to be used for the interference confirmation is automatically selected by the processor and the memory from the first threshold and the second threshold based on one of a velocity, an acceleration, and a force that occurs by a movement of one of the robot and the object.

13. The information processing method according to claim 12, wherein, in a state where any one of the velocity, the acceleration, and the force that occurs by the movement of one of the robot and the object exceeds a predetermined range, the greater threshold of the first threshold and the second threshold is selected as the threshold to be used for the interference confirmation by the processor and the memory.

14. The information processing method according to claim 1, wherein, in a state where any one of a velocity, an acceleration, and a force that occurs by a movement of one of the robot and the object exceeds a predetermined range, the threshold to be used for the interference confirmation can be set to a fixed value by the processor and the memory.

15. A manufacturing method of a product comprising:
performing a simulation by using the information processing method according to claim 1 in the virtual space for an interference confirmation between the robot and the object; and
manufacturing a product by operating the object by the robot apparatus in real space based on the control data.

16. A computer-readable non-transitory storage medium configured to store a program for executing the information processing method according to claim 1 by a computer.

17. The information processing method according to claim 12, wherein a value for any one of the velocity, the acceleration, and the force can be set as a value for changing the threshold to be used for the interference confirmation by the processor and the memory.

18. An information processing apparatus comprising:
a processor and a memory that are configured to perform interference confirmation between a robot and an object by a simulation in a virtual space,
wherein the processor and the memory are configured to:
set a first threshold for the robot and a second threshold for the object,
perform the interference confirmation by selecting either the first threshold or the second threshold, wherein, in the interference confirmation, an interference notification is performed by the processor and the memory in a case where a distance of the robot and the object is equal to or less than a smaller value between the first threshold and the second threshold, and
output a control data for avoiding an interference between the robot and the object based on the interference confirmation executed by using the first threshold or the second threshold through the simulation.

19. A robot system comprising:
the information processing apparatus according to claim 18,
a robot in real space; and
an object in the real space.

20. The robot system according to claim 19, comprising:
controller configured to control the robot; and
a display configured to display information communicated by the controller and the information processing apparatus,
wherein the information processing apparatus is configured to execute an operation and the simulation of the robot hand according to the information displayed on the display, and
wherein the interference confirmation is included in the simulation.

* * * * *